(12) United States Patent
Park et al.

(10) Patent No.: US 9,786,932 B2
(45) Date of Patent: Oct. 10, 2017

(54) METAL-AIR BATTERY

(71) Applicant: Samsung Electronics Co., Ltd., Suwon-si, Gyeonggi-do (KR)

(72) Inventors: Minsik Park, Hwaseong-si (KR); Jeongsik Ko, Seongnam-si (KR); Heungchan Lee, Seongnam-si (KR); Dongmin Im, Seoul (KR)

(73) Assignee: SAMSUNG ELECTRONICS CO., LTD, Gyeonggi-Do (KR)

( * ) Notice: Subject to any disclaimer, the term of this patent is extended or adjusted under 35 U.S.C. 154(b) by 0 days.

(21) Appl. No.: 15/450,034

(22) Filed: Mar. 6, 2017

(65) Prior Publication Data

US 2017/0179506 A1    Jun. 22, 2017

Related U.S. Application Data

(62) Division of application No. 14/637,548, filed on Mar. 4, 2015, now Pat. No. 9,634,365.

(30) Foreign Application Priority Data

Sep. 15, 2014    (KR) ........................ 10-2014-0122037

(51) Int. Cl.
*H01M 12/06* (2006.01)
*H01M 12/02* (2006.01)
*H01M 8/24* (2016.01)
*H01M 8/04082* (2016.01)
*H01M 12/08* (2006.01)

(52) U.S. Cl.
CPC ....... *H01M 8/04201* (2013.01); *H01M 12/08* (2013.01)

(58) Field of Classification Search
None
See application file for complete search history.

(56) References Cited

U.S. PATENT DOCUMENTS

| 6,342,314 | B1 | 1/2002 | Sieminski et al. |
| 6,753,672 | B2 | 6/2004 | Lin |
| 6,811,910 | B2 | 11/2004 | Tsai et al. |
| 2008/0241668 | A1 | 10/2008 | Wang Chen |
| 2010/0285375 | A1 | 11/2010 | Friesen et al. |
| 2011/0200891 | A1 | 8/2011 | Kotani et al. |
| 2013/0189592 | A1 | 7/2013 | Roumi et al. |
| 2015/0140452 | A1 | 5/2015 | Park et al. |

FOREIGN PATENT DOCUMENTS

| JP | 201449216 A | 3/2014 |
| KR | 1020130093094 A | 8/2013 |
| KR | 1020130108321 A | 10/2013 |
| KR | 1020150058616 A | 5/2015 |

*Primary Examiner* — Yoshitoshi Takeuchi
(74) *Attorney, Agent, or Firm* — Cantor Colburn LLP

(57) ABSTRACT

A metal-air battery includes first and second cells, each cell including a negative electrode metal layer, a negative electrode electrolytic film, a positive electrode layer configured to use oxygen as an active material, and a gas diffusion layer, wherein the negative electrode metal layer, the negative electrode electrolytic film, the positive electrode layer, and the gas diffusion layer are sequentially disposed, wherein each cell has an open surface through which at least a portion of the gas diffusion layer is in fluid communication with, outside air, wherein the first and second cells contact each other, and wherein a direction of a first open surface of the first cell is different from a direction of a second open surface of the second cell.

9 Claims, 23 Drawing Sheets

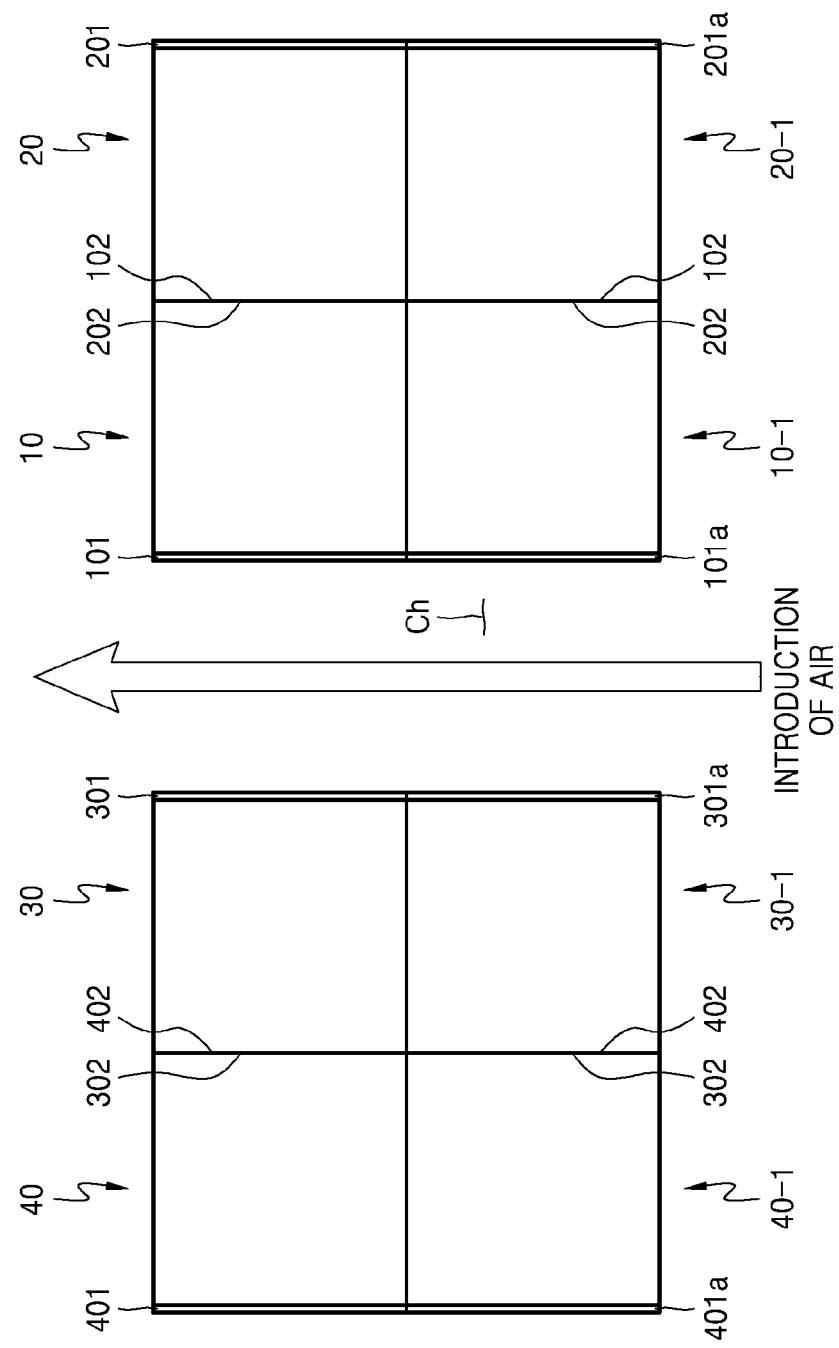

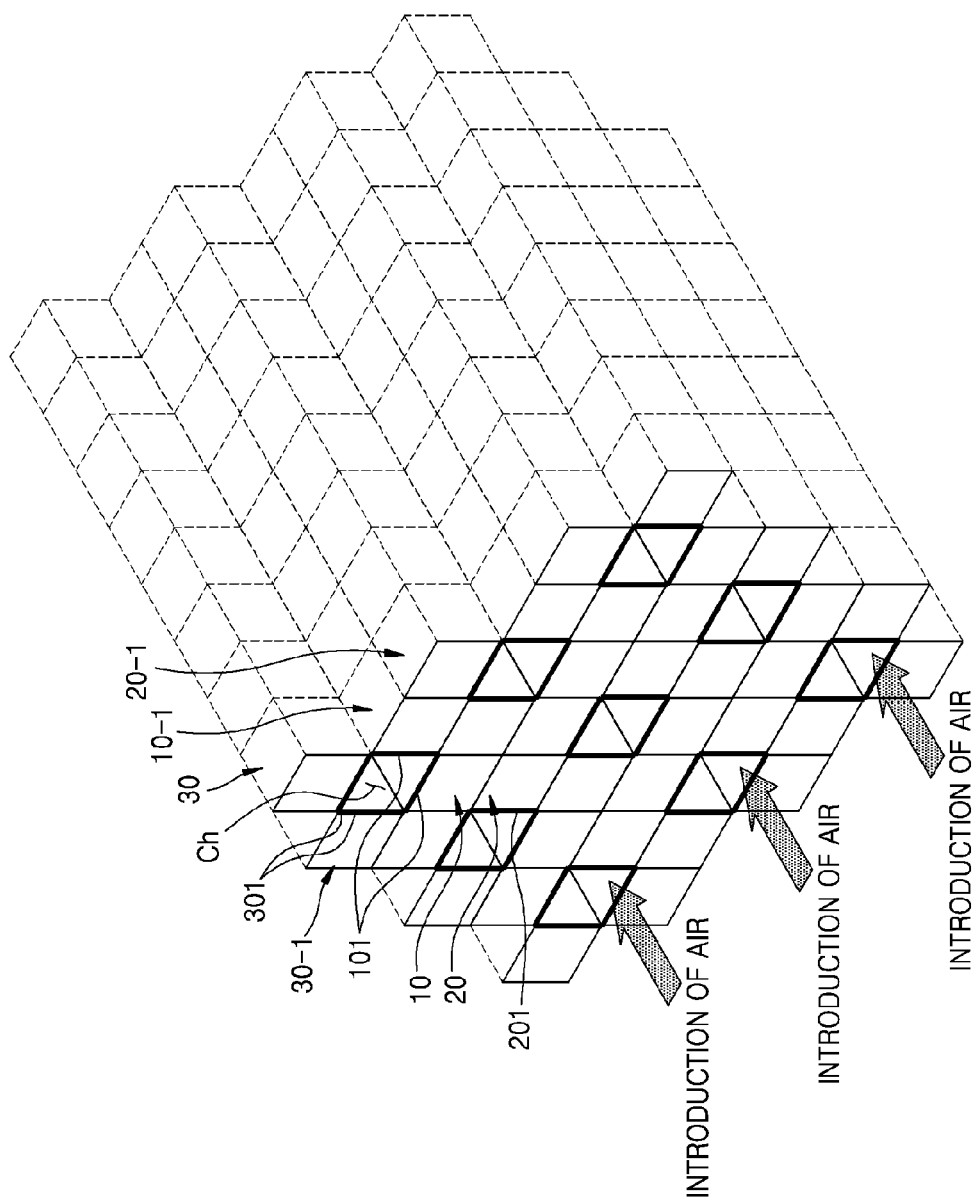

METAL-AIR BATTERY

CROSSREFERENCE TO RELATED APPLICATION

This application is a divisional of U.S. application Ser. No. 14/637,548, filed on Mar. 4, 2015, which claims priority to and the benefit of Korean Patent Application No. 10-2014-0122037, filed on Sep. 15, 2014, in the Korean Intellectual Property Office, and all the benefits accruing therefrom under 35 U.S.C. §119, the contents of which are incorporated herein in their entirety by reference.

BACKGROUND

1. Field

The present disclosure relates to metal-air batteries, and more particularly, to metal-air batteries having improved air handling and improved energy density.

2. Description of the Related Art

A metal-air battery includes a negative electrode that may store/release ions and a positive electrode that uses oxygen from the air as an active material. In the metal-air battery, reduction/oxidation of oxygen introduced from the outside occurs in the positive electrode, oxidation/reduction of a metal occurs in the negative electrode, and chemical energy that is produced in these reactions is extracted as electrical energy. For example, the metal-air battery absorbs oxygen during discharging and emits oxygen during charging. Since the metal-air battery uses oxygen that is present in the atmosphere, an energy density of the metal-air battery may be a dramatic increase over other types of secondary batteries. For example, the metal-air battery may have an energy density that is several times higher than an energy density of a lithium-ion battery.

Also, since there is a low possibility that the metal-air battery may ignite at an abnormally high temperature, the metal-air battery has excellent stability. Since the metal-air battery operates only by storing/releasing oxygen and does not use a heavy metal, the risk of environmental pollution is low. Due to such various advantages, much research has been conducted on metal-air batteries. Nonetheless the remains a need for improved materials for metal-air batteries.

SUMMARY

Provided are metal-air batteries in which cells have improved air supply and increased energy density.

Additional aspects will be set forth in part in the description which follows and, in part, will be apparent from the description.

According to an aspect, a metal-air battery includes: first and second cells, each cell including a negative electrode metal layer, a negative electrode electrolytic film, a positive electrode layer configured to use oxygen as an active material, and a gas diffusion layer, wherein the negative electrode metal layer, the negative electrode electrolytic film, the positive electrode layer, and the gas diffusion layer are sequentially disposed, wherein each cell has an open surface through which at least a portion of the gas diffusion layer is in fluid communication with, outside air, wherein the first and second cells contact each other, and wherein a direction of a first open surface of the first cell is different from a direction of a second open surface of the second cell.

The direction of the open surface of the first cell may be opposite to the direction of the open surface of the second cell.

The direction of the open surface of the first cell may intersect the direction of the open surface of the second cell.

The first cell may include a second surface that is disposed in a direction opposite to the direction of the open surface of the first cell, and the second cell may contact the second surface of the first cell.

The negative electrode metal layer of the first cell may contact the negative electrode metal layer of the second cell.

The negative electrode metal layer of the first cell and the negative electrode metal layer of the second cell may be integrally formed with each other.

In at least one of the first and second cells, the negative electrode metal layer, the negative electrode electrolytic film, and the positive electrode layer may be in a bent state so that the positive electrode layer contacts a first surface of the gas diffusion layer (GDL) and a second surface of the GDL that is disposed in a direction opposite to a direction in which the first surface of the GDL is disposed and a side surface of the GDL between the first and second surfaces of the GDL is in fluid communication with, outside air.

Each of the first and second cells may further include an outer casing that surrounds the negative electrode metal layer, the negative electrode electrolytic film, and the positive electrode layer.

The metal-air layer may further include a third cell in which a negative electrode metal layer, a negative electrode electrolytic film, a positive electrode layer that uses oxygen as an active material, and a GDL are sequentially disposed and that have an open surface through which at least a portion of the GDL is exposed to, e.g., is in fluid communication with, outside air, wherein the third cell is spaced apart from the first and second cells and is disposed so that the open surface of the third cell and the open surface of the first cell face each other.

A channel to which air is introduced may be defined by the open surface of the third cell and the open surface of the first cell.

A size of the channel may be maintained constant in a direction in which the air is introduced.

A size of the channel may decrease in a direction in which the air is introduced.

The metal-air battery may further include a nozzle that is disposed around an inlet of the channel and has a cross-sectional area that decreases in a direction in which the air is introduced.

The metal-air battery may further include a fourth cell in which a negative electrode metal layer, a negative electrode electrolytic film, a positive electrode layer that uses oxygen as an active material, and a GDL are sequentially arranged and have an open surface through which at least a portion of the GDL is in fluid communication with, outside air, wherein the fourth cell contacts the third cell and a direction of the open surface of the fourth cell is different from a direction of the open surface of the third cell.

A plurality of the first cells and a plurality of the second cells may be provided, wherein the plurality of first cells may be arranged in a first direction and the plurality of second cells may be arranged in a direction that is parallel to the first direction.

A plurality of the third cells may be provided, wherein the plurality of third cells may be arranged in a direction that is parallel to the first direction or is inclined with respect to the first direction.

The first and second cells may have a square or a rectangular cross-sectional shape.

The metal-air battery may further include an air circulator that includes a first area that is disposed around an inlet of the channel and applies a first pressure, a second area that is disposed around an outlet of the channel and applies a second pressure that is less than the first pressure, and a third area that connects the first area and the second area and applies a third pressure that is greater than the first pressure.

According to an aspect, a metal-air battery includes: first and third cells, each cell including a negative electrode metal layer, a negative electrode electrolytic film, a positive electrode layer configured to use oxygen as an active material, and a gas diffusion layer sequentially disposed, wherein the negative electrode metal layer, the negative electrode electrolytic film, and the positive electrode layer are in a bent state so that the positive electrode layer contacts a first surface of the gas diffusion layer and a second surface of the gas diffusion layer is disposed in a direction opposite to a direction in which the first surface of the gas diffusion layer is disposed and a side surface of the gas diffusion layer between the first and second surfaces of the gas diffusion layer is in fluid communication with, outside air, wherein the first and third cells are spaced apart from each other and the open surface of the first cell and the open surface of the third cell face each other.

In another aspect, disclosed is a method of manufacturing a metal-air battery, the method including: providing a negative electrode metal layer, a negative electrode electrolytic film, and a positive electrode layer configured to use oxygen as an active material, wherein the negative electrode electrolytic film is between the negative electrode metal layer and the positive electrode layer; bending the negative electrode metal layer, the negative electrode electrolytic film, and the positive electrode layer around three surfaces of a first gas diffusion layer; reversely bending the negative electrode metal layer, the negative electrode electrolytic film, and the positive electrode layer by 180 degrees; disposing a second gas diffusion layer on the positive electrode layer; secondly bending the negative electrode metal layer, the negative electrode electrolytic film, and the positive electrode layer so that the positive electrode layer contacts a top surface of the second gas diffusion layer to form a first cell; repeating the providing, the bending, the reversely bending, the disposing and the secondly bending to form a second cell; and contacting a surface of the first cell and a surface of the second cell to manufacture the metal-air battery, wherein each of the first cell and the second cell has an open surface through which at least a portion of the gas diffusion layer is in fluid communication with outside air, and wherein a direction of the open surface of the first cell is different from a direction of the open surface of the second cell.

BRIEF DESCRIPTION OF THE DRAWINGS

These and/or other aspects will become apparent and more readily appreciated from the following description of the exemplary embodiments, taken in conjunction with the accompanying drawings in which:

FIG. 6C is a plan view illustrating an embodiment in which the metal-air battery of FIG. 5 includes two first through fourth cells;

FIG. 13 is a perspective view illustrating an embodiment in which the metal-air battery of FIG. 12 includes a plurality of the first through third cells;

DETAILED DESCRIPTION

Figure 1A:
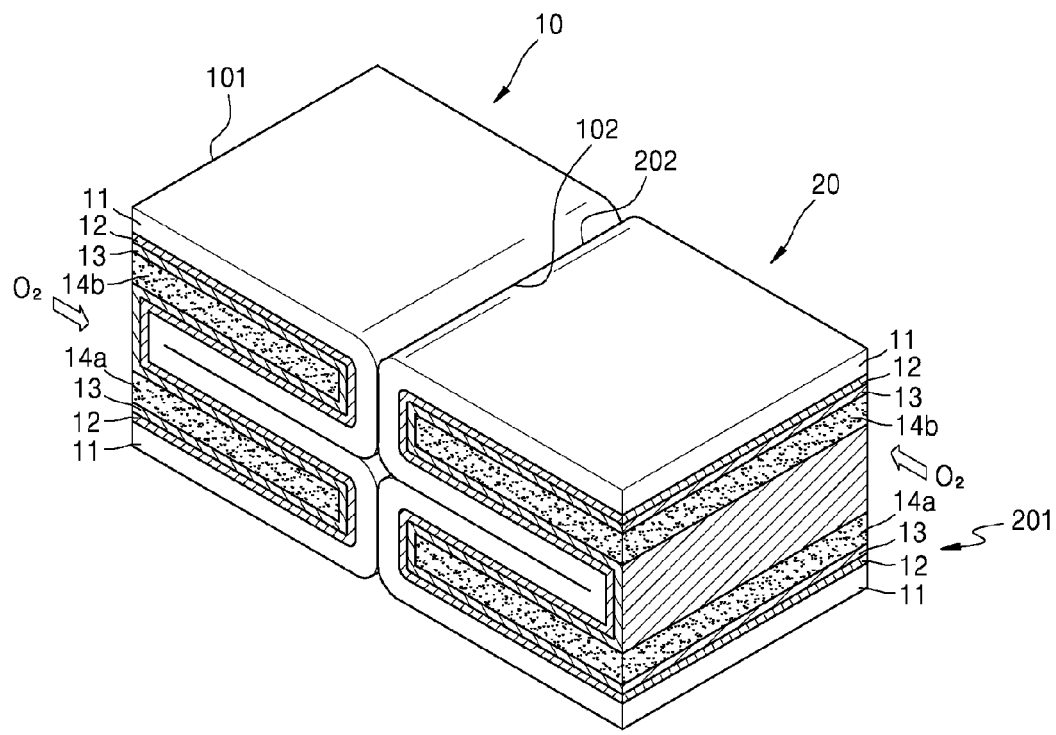
FIG. 1A is a perspective view illustrating an embodiment of a metal-air battery.

The inventive concept will now be described more fully with reference to the accompanying drawings, in which exemplary embodiments of the invention are shown. In the drawings, the same reference numerals denote the same elements and the sizes of components may be exaggerated for clarity and convenience of explanation. The inventive concept may have different forms and should not be construed as limited to the exemplary embodiments set forth herein. Rather, these embodiments are provided so that this disclosure will be thorough and complete, and will fully convey the scope of the invention to those skilled in the art. Like reference numerals refer to like elements throughout.

For example, it will also be understood that when a layer is referred to as being "on" another layer, it can be directly on the other layer, or intervening layers may also be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Expressions such as "at least one of," when preceding a list of elements, modify the entire list of elements and do not modify the individual elements of the list.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 1B:
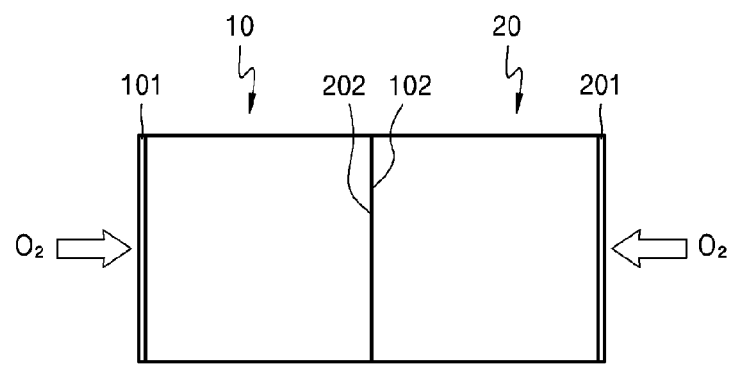
FIG. 1B is a plan view illustrating an embodiment of first and second cells of the battery of FIG. 1A.

FIG. 1A is a perspective view illustrating an embodiment of a metal-air battery. FIG. 1B is a plan view illustrating first and second cells 10 and 20 of FIG. 1A, according to an embodiment. In FIG. 1B, first and second open surfaces 101 and 201, from among surfaces of the first and second cells 10 and 20, are shown schematically for clarity.

Referring to FIG. 1A, the metal-air battery includes at least two cells. For example, the metal-air battery includes the first cell 10 and the second cell 20.

Each of the first and second cells 10 and 20 may include a negative electrode metal layer 11, a negative electrode electrolytic film 12, a positive electrode layer 13, and a gas diffusion layer (GDL), for example, first and second GDLs 14a and 14b.

The negative electrode metal layer 11, for occluding and emitting metal ions, may comprise, for example, lithium (Li), sodium (Na), zinc (Zn), potassium (K), calcium (Ca), magnesium (Mg), iron (Fe), aluminum (Al), an alloy thereof, or a combination thereof.

The negative electrode electrolytic film 12 functions to transmit metal ions to the positive electrode layer 13. To this end, the negative electrode electrolytic film 12 may include an electrolyte that comprises a metal salt and a solvent. The electrolyte may be in a solid phase including a polymer-based electrolyte, an inorganic electrolyte, or a composite electrolyte comprising a combination of the polymer-based electrolyte and the inorganic electrolyte. A negative electrode electrolytic film that is flexible, e.g., can be bent, is mentioned. For example, the metal salt may be a lithium salt such as $LiN(SO_2CF_2CF_3)_2$, $LiN(SO_2C_2F_5)_2$, $LiClO_4$, $LiBF_4$, $LiPF_6$, $LiSbF_6$, $LiAsF_6$, $LiCF_3SO_3$, $Li\ N(SO_2CF_3)_2$, LiC (SO$_2$CF$_3$)$_3$, LiN(SO$_3$CF$_3$)$_2$, LiC$_4$F$_9$SO$_3$, LiAlCl$_4$, lithium bis(trifluoromethanesulfonyl)imide (LiTFSI), or a combination thereof. Another metal salt such as AlCl$_3$, MgCl$_2$, NaCl, KCl, NaBr, KBr, or CaCl$_2$ may be added to the lithium salt. The solvent may be any suitable material as long as it may dissolve the lithium salt and the metal salt.

Also, the negative electrode electrolytic film 12 may further include a separation film that prevents transmission of oxygen and has conductivity for the metal ions. The separation film may be a polymer-based separation film that is flexible, e.g., may be bent. For example, the separation film may comprise a polymeric nonwoven fabric such as a nonwoven fabric comprising polypropylene, a nonwoven fabric comprising polyphenylene sulfide, or a porous film of olefin-based resin such as polyethylene or polypropylene. The combination thereof may be used. The separation film and the electrolyte may be formed as separate layers, or the negative electrode electrolytic film 12 may be formed as a single layer by impregnating pores of the porous separation film with the electrolyte. For example, the negative electrode electrolytic film 12 may be formed by impregnating the pores of the porous separation film with the electrolyte that is formed by mixing polyethylene oxide (PEO) with LiTFSI.

The positive electrode layer 13 may include an electrolyte for conducting the metal ions, a catalyst for oxidizing/reducing oxygen, a conductive material, and a binder. For example, the positive electrode layer 13 may be formed by preparing a positive electrode slurry by mixing the electrolyte, the catalyst, the conductive material, and the binder and adding a solvent, and coating and drying the positive electrode slurry on the negative electrode electrolytic film 12.

The electrolyte may include the lithium salt or the metal salt. For example, the conductive material may comprise a porous carbon-based material, a conductive metal material, a conductive organic material, or a combination thereof. For example, the carbon-based material may be carbon black, graphite, graphene, activated carbon, carbon fabric, carbon nanotubes, or combination thereof. For example, the conductive metal material may be used in the form of metal powder. For example, the catalyst may comprise platinum (Pt), gold (Au), or silver (Ag), an oxide of manganese (Mn), nickel (Ni), or cobalt (Co), or combination thereof. Also, the binder may comprise, for example, polytetrafluoroethylene (PTFE), polypropylene, polyvinylidene fluoride (PVDF), polyethylene, styrene-butadiene rubber, or combination thereof.

The first GDL 14a functions to absorb oxygen in the atmosphere and supply the oxygen to the positive electrode layer 13. To this end, the first GDL layer 14a may have a porous structure for smoothly diffusing external oxygen. For example, the first GDL layer 14a may comprise a carbon paper comprising a carbon fiber, carbon cloth, carbon felt, sponge-shape foam metal, or combination thereof, or they metal fiber mat. A combination comprising at least one of the foregoing may be used.

Referring to FIG. 1A, the negative electrode metal layer 11, the negative electrode electrolytic film 12, and the positive electrode layer 13 are bent to surround at least three surfaces of each of the first and second GDLs 14a and 14b. For example, the first GDL 14a may be partially disposed on the positive electrode layer 13, and then the negative electrode metal layer 11, the negative electrode electrolytic film 12, and the positive electrode layer 13 may be bent on the first GDL 14a so that the positive electrode layer 13 contacts a top surface of the first GDL 14a. The positive electrode layer 13 contacts a bottom surface, the top surface, and a side, e.g., a right-hand side, surface of the first GDL 14a.

Next, the negative electrode metal layer 11, the negative electrode electrolytic film 12, and the positive electrode layer 13 may be reversely bent by 180° so that the positive electrode layer 13 is exposed upward. Then, the second GDL 14b may be further disposed on the positive electrode layer 13, and the negative electrode metal layer 11, the negative electrode electrolytic film 12, and the positive electrode layer 13 may be bent on the second GDL 14b so that the positive electrode layer 13 contacts a top surface of the second GDL 14b. Accordingly, each of the first and second cells 10 and 20 may include two sub-cells.

As described above, the number of sub-cells in the metal-air battery may be increased by repeatedly performing a process of disposing the first and second GDLs 14a and 14b on the positive electrode layer 13 and allowing the negative electrode metal layer 11, the negative electrode electrolytic film 12, and the positive electrode layer 13 to be bent. According to the present embodiment, even when the number of sub-cells is increased by repeatedly performing the process of disposing the first and second GDLs 14a and 14b on the positive electrode layer 13 and allowing the negative electrode metal layer 11, the negative electrode electrolytic film 12, and the positive electrode layer 13 to be bent, parts of the first and second GDLs 14a and 14b may always be exposed to, e.g., are in fluid communication with, outside air. Accordingly, according to the present embodiment, oxygen may be easily supplied to the positive electrode layer 13 regardless of the number of sub-cells in the metal-air battery. However, the number of sub-cells included in the first and second cells 10 and 12 is not limited to be a plural number and may be only 1.

The first and second GDLs 14a and 14b may be exposed to, e.g., be in fluid communication with, outside air on at least one side of the first and second cells 10 and having such a folded structure. Accordingly, oxygen that is used for oxidation/reduction in the positive electrode layer 13 may be absorbed from one side of each of the first and second GDLs 14a and 14b and may be supplied to the entire positive electrode layer 13.

As is further described above, surfaces of the first and second cells 10 and 20, through which at least parts of the first and second GDLs 14a and 14b are exposed to, e.g., are in fluid communication with, outside air, are defined as the first and second open surfaces 101 and 201.

Referring to FIGS. 1A and 1B, the first cell 10 and the second cell 20 may contact each other, and the first open surface 101 of the first cell 10 and the second open surface 201 of the second cell 20 may be formed (or disposed) in different directions, e.g., opposite directions.

For example, a direction in which the open surface 101 of the first cell 10 is formed (hereinafter, referred to as the direction of the first open surface 101 of the first cell 10) and a direction in which the second open surface 201 of the second cell 20 is formed (hereinafter, referred to as the direction of the second open surface 201 of the second cell 20) may be opposite to each other. For example, the direction of the open surface 101 of the first cell 10 may be a left direction and the direction of the second open surface 201 of the second cell 20 may be a right direction.

The first and second cells 10 and 20 respectively include the first and second open surfaces 101 and 201 and first and second inner surfaces 102 and 202 that are formed in directions that are opposite to the directions of the first and second open surfaces 101 and 201 of the first and second cells 10 and 20. The second cell 20 may contact the first inner surface 102 of the first cell 10. For example, the second inner surface 202 of the second cell 20 may contact the first inner surface 102 of the first cell 10.

As described above, since the first and second cells 10 and 20 contact each other, an area or a volume which is occupied by the first and second cells 10 and 20 in the metal-air battery may be reduced, when compared to a case where the first and second cells 10 and 20 do not contact each other.

Since the first open surface 101 of the first cell 10 and the second open surface 201 of the second cell 20 are formed in different directions, air may be smoothly or sufficiently supplied to the first and second open surfaces 101 and 201 and the first and second cells 10 and 20 may be easily repeatedly arranged. When the first and second cells 10 and 20 are repeatedly arranged by using the first and second cells 10 and 20 that contact each other as one unit, the first and second open surfaces 101 and 201 may be spaced apart from each other to face each other. Since the first and second open surfaces 101 and 201 that face each other share a channel Ch, the number of total channels Ch may be reduced, which will be further explained below.

Also, since surfaces of the first and second cells 10 and 20 other than the first and second open surfaces 101 and 201 contact each other, air supply to the first open surfaces 101 and first inner 102 may not be affected by the contact of the other surfaces and an area or volume which the first and second cells 10 and 20 occupy in the metal-air battery may be reduced.

Figure 2A:
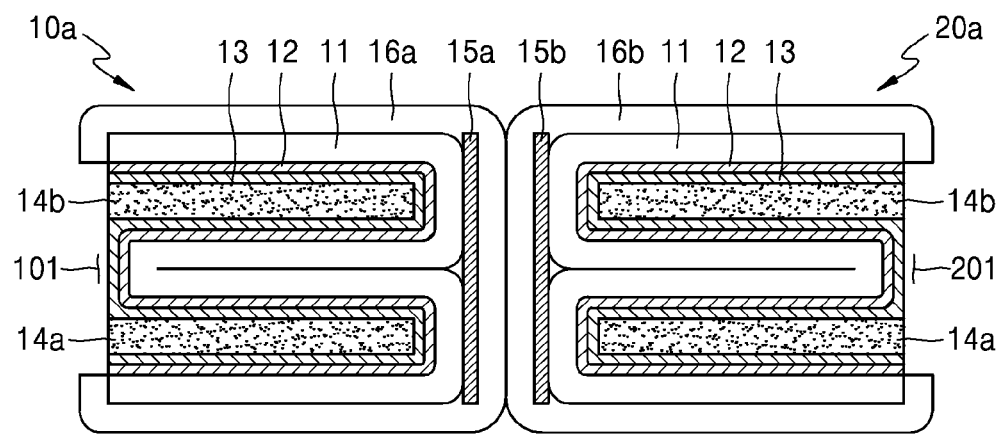
FIGS. 2A and 2B are cross-sectional views illustrating an embodiment in which the metal-air battery of FIG. 1A further includes first and second negative electrode collectors and first and second outer casings in addition to the first and second cells.
Figure 2B:
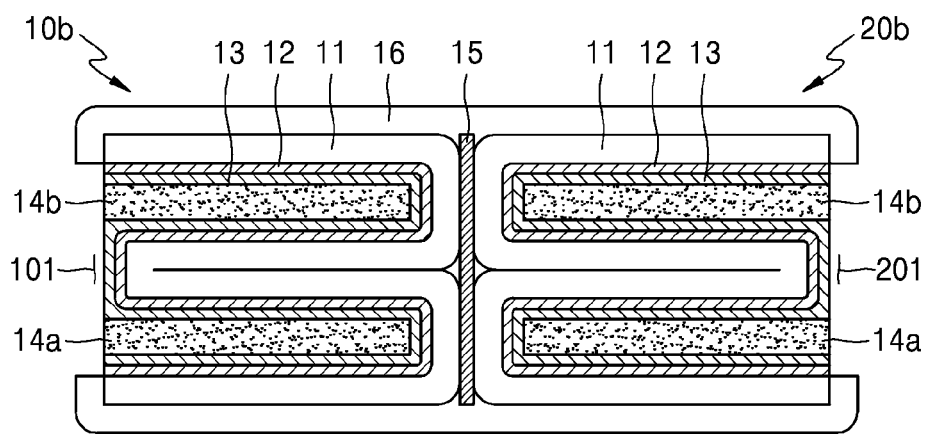

FIGS. 2A and 2B are cross-sectional views illustrating an embodiment wherein the metal-air battery of FIG. 1A further includes first and second negative electrode collectors 15a and 15b and first and second outer casings 16a and 16b in addition to the first and second cells 10 and 20, according to an embodiment.

Referring to FIG. 2A, a first cell 10a and a second cell 20a may respectively further include the first and second negative electrode collectors 15a and 15b. The first and second negative electrode collectors 15a and 15b may be disposed to contact end, e.g., bent, portions of the negative electrode metal layers 11. The first and second negative electrode collectors 15a and 15b may comprise a thin films of a conductive metal such as copper (Cu). The first and second negative electrode collectors 15a and 15b may extend in a direction perpendicular to a direction in which the negative electrode metal layers 11, the negative electrode electrolytic films 12, the positive electrode layers 13, and the first and second GDLs 14a and 14b are arranged. Since the first and second negative electrode collectors 15a and 15b flatly extend in the perpendicular direction without being bent irrespective of the number of sub-cells, a material used to form the first and second negative electrode collectors 15a and 15b may be reduced and a ratio, e.g., a weight ratio, of a weight of the first and second negative electrode collectors 15a and 15b to a total weight of the metal-air battery may be reduced. For example, a ratio of a weight of the first and second negative electrode collectors 15 to a total weight of the metal-air battery excluding the first and second outer casings 16a and 16b may be equal to or less than about 10 weight percent (wt %) or about 5 wt %, or about 1 wt % to about 10 wt %.

The first cell 10a and the second cell 20a may be respectively surrounded by the first and second outer casings 16a and 16b. The first and second outer casings 16a and 16b may be pouch films, for example.

The first outer casing 16a may surround a top surface, a right surface, and a bottom surface of the first cell 10a. The second outer casing 16b may surround a top surface, a left surface, and a bottom surface of the second cell 20a.

Although not shown in FIG. 2A, the first outer casing 16a may also surround a front surface and a rear surface of the first cell 10a and the second outer casing 16b may also surround a front surface and a rear surface of the second cell 20a. That is, five surfaces of the first cell 10a, e.g., surfaces except a left-hand side surface, may be surrounded by the first outer surface 16a, and five surfaces of the second cell 20a, e.g., surfaces except a right-hand side surface, may be surrounded by the second outer casing 16b. Accordingly, the first open surface 101 is formed on the left-hand side of the first cell 10a and the second open surface 201 is formed on the right-hand side of the second cell 20a. In this case, the first outer casing 16a of the first battery cell 10a and the second outer casing 16b of the second battery cell 20a may contact each other.

Referring to FIG. 2B, first and second cells 10b and 20b according to another embodiment may include and share a single negative electrode collector 15. Accordingly, the number of negative electrode collectors 15 may be further reduced, the costs of the metal-air battery may be reduced, and a weight of the metal-air battery may be further reduced.

Also, the first and second cells 10b and 20b may be surrounded by an outer casing 16. The outer casing 16, unlike the first and second outer casings 16a and 16b of FIG. 2A, may not surround a right-hand surface of the first cell 10b or a left-hand surface of the second cell 20b, and may prevent the positive electrode layers 13, the negative electrode electrolytic films 12, and the negative electrode metal layers 11 of the first and second cells 10b and 20b from being exposed to air. The outer casing 16 may surround top surfaces and bottom surfaces of the first and second cells 10b and 20b. Although not shown in FIG. 2B, the outer casing 16 may surround front surfaces and rear surfaces of the first and second cells 10b and 20b as well. The first open surface 101 may be formed on the left-hand side of the first cell 10b and the second open surface 201 may be formed on the right-hand side of the second cell 20b. Since the first and second cells 10b and 20b are surrounded by a single outer casing 16, the number of outer casings 16 may be reduced, costs of the metal-air battery may be reduced, and a weight of the metal-air battery may be reduced.

Figure 3A:
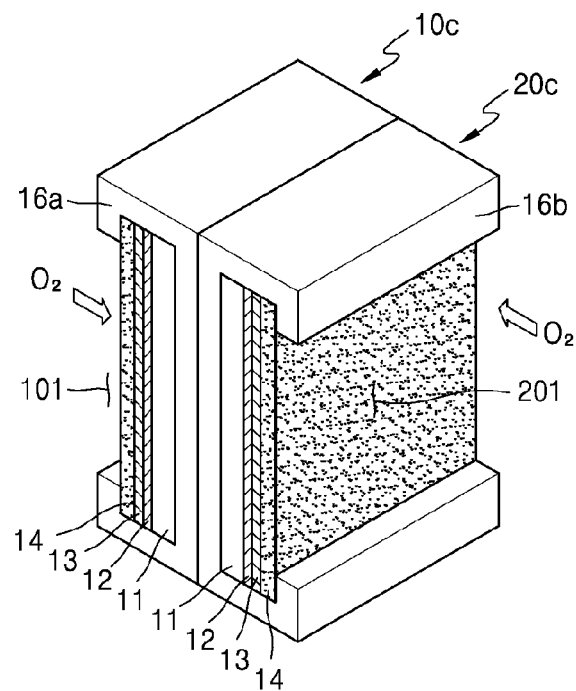
FIGS. 3A and 3B are perspective views illustrating another embodiment of the metal-air battery.
Figure 3B:
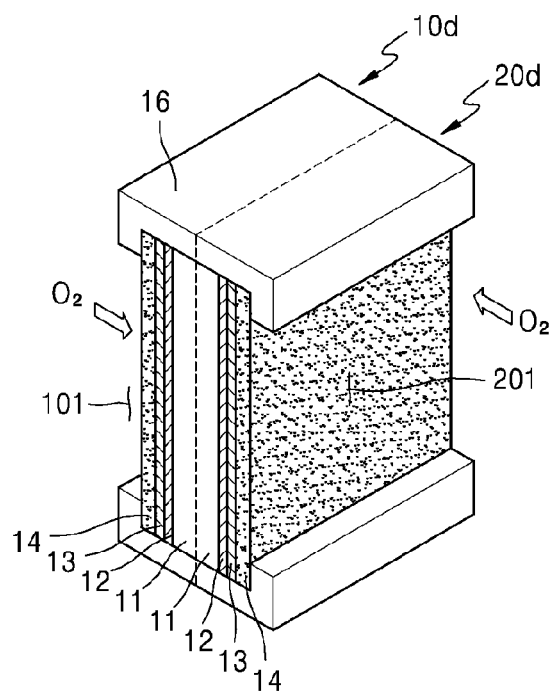

The first and second batteries 10, 10a, 10b, 20, 20a, and 20b have folded structures in the above embodiments. However, structures of the first and second cells 10, 10a, 10b, 20, 20a, and 20b are not limited thereto and various modifications may be made. FIGS. 3A and 3B are perspective views illustrating the metal-air battery in which structures of the first and second cells 10, 10a, 10b, 20, 20a, and 20b are changed, according to another embodiment.

Referring to FIG. 3A, the metal-air battery includes first and second batteries 10c and 20c. In each of the first and second cells 10c and 20c, a GDL 14, the positive electrode layer 13, the negative electrode electrolytic film 12, and the negative electrode metal layer 11 are sequentially arranged. The first and second cells 10c and 20c respectively include the first and second outer casings 16a and 16b for preventing the positive electrode layers 13, the negative electrode electrolytic films 12, and the negative electrode metal layers 11 from being exposed to air.

Referring to FIG. 3B, the metal-air battery includes first and second cells 10d and 20d. In each of the first and second cells 10d and 20d, the GDL 14, the positive electrode layer 13, the negative electrode electrolytic film 12, and the negative electrode metal layer 11 are sequentially arranged. The negative electrode metal layer 11 of the first cell 10d may contact the negative electrode metal layer 11 of the second cell 20d. For example, the negative electrode metal layer 11 of the first cell 10d and the negative electrode metal layer 11 of the second cell 20d may be integrally formed with each other.

The first and second cells 10d and 20d may include the outer casing 16 for preventing the positive electrode layers 13, the negative electrode electrolytic films 12, and the negative electrode metal layers 11 from being exposed to air. Unlike the first and second outer casings 16a and 16b of FIG. 3A, the outer casing 16 may not surround a right-hand surface of the first cell 10d and a left-hand surface of the second cell 20d, and may prevent the positive electrode layers 13, the negative electrode electrolytic films 12, and the negative electrode metal layers 11 of the first and second battery cells 10d and 20d from being exposed to air.

Figure 4:
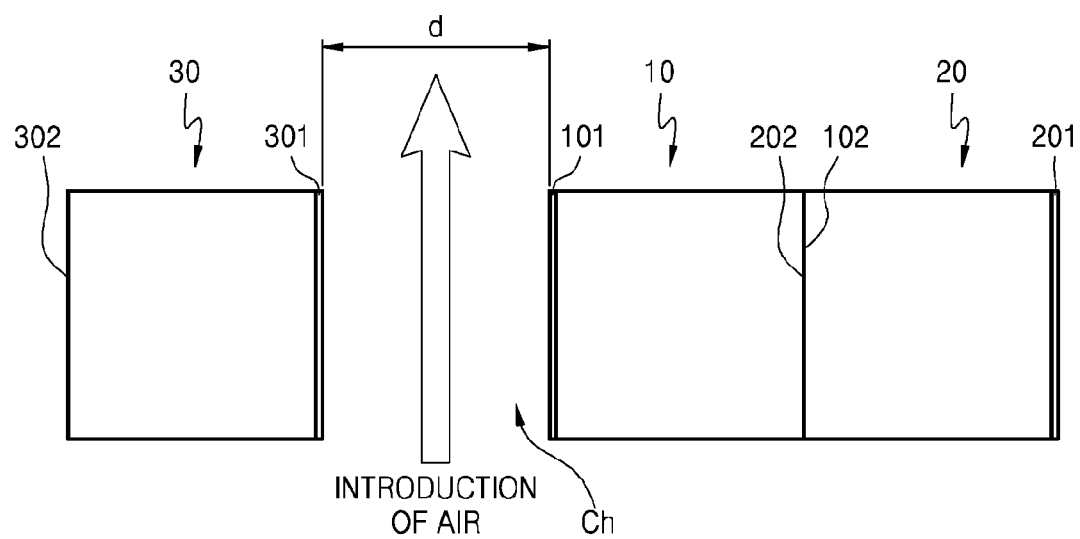
FIG. 4 is a plan view illustrating an embodiment in which the metal-air battery of FIG. 1B further includes a third cell.
Figure 5:
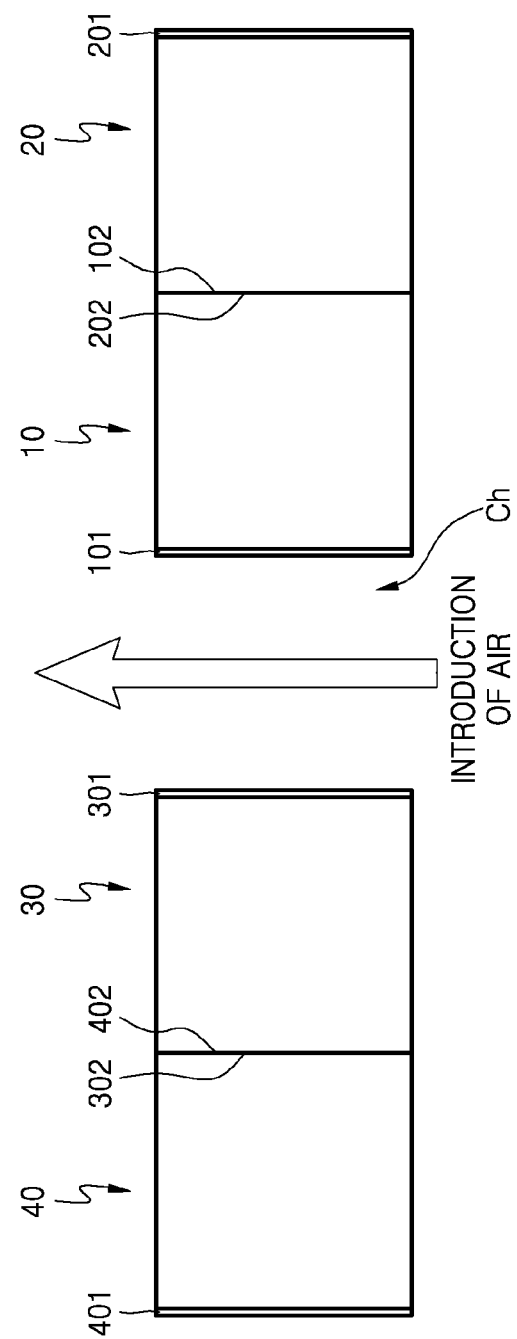
FIG. 5 is a plan view illustrating an embodiment in which the metal-air battery of FIG. 4 further includes a fourth cell.

FIG. 4 is a plan view illustrating another embodiment wherein the metal-air battery of FIG. 1B further includes a third cell 30, according to an embodiment. FIG. 5 is a plan view illustrating another embodiment wherein the metal-air battery of FIG. 5 further includes a fourth cell 40, according to an embodiment.

Referring to FIG. 4, the metal-air battery of the present embodiment may further include the third cell 30.

The third cell 30 includes the negative electrode metal layer 11, the negative electrode electrolytic film 12, the positive electrode layer 13, and the first and second GDLs 14a and 14b. The third cell 30 has a third open surface 301 through which at least parts of the first and second GDLs 14a and 14b are exposed to, e.g., are in fluid communication with, outside air. A material and a position of each layer is substantially the same as those in the first and second cells 10, 10a, 10b, 10c, 10d, 20, 20a, 20b, 20c, and 20d, and thus a repeated explanation thereof will not be given.

The third cell 30 may be spaced apart from the first and second cells 10 and 20. The third cell 30 is spaced apart from the first cell 10 by a predetermined interval.

The third cell 30 may be spaced apart from the first cell 10 so that the third open surface 301 of the third cell 30 faces the first open surface 101 of the first cell 10.

The channel Ch to which air is introduced may be defined by the third open surface 301 of the third cell 30 and the first open surface 101 of the first cell 10. A size d of the channel Ch may be determined by the predetermined interval between the third cell 30 and the first cell 10.

Air may be supplied to the channel Ch. As the air is supplied to the channel Ch, the air is supplied to the first and third open surfaces 101 and 301 of the first and third cells 10 and 30. That is, the channel Ch may supply oxygen that is included in the air to the first and third cells 10 and 30. Since the air is supplied to the first and third open surfaces 101 and 301 of the first and third cells 10 and 30 due to use of a single channel Ch, the number of channels Ch may be reduced.

Unlike in the present embodiment, when the first and third open surfaces 101 and 301 of the first and third cells 10 and 30 do not face each other, a separate channel Ch for each of the first and third open surfaces 101 and 301 of the first and third cells 10 and 30 may be provided. However, in the present embodiment, since the first and third open surfaces 101 and 301 of the first and third cells 10 and 30 face each other, and thus a single channel Ch for both of the first and third open surfaces 101 and 301 of the first and third cells 10 and 30 can be used, the number of channels Ch may be reduced by about 50%.

Referring to FIG. 5, the metal-air battery may further include a fourth cell 40.

The fourth cell 40 includes the negative electrode metal layer 11, the negative electrode electrolytic film 12, the positive electrode layer 13, and the first and second GDLs 14a and 14b. The fourth cell 40 has a fourth open surface 401 through which at least portions of the first and second GDLs 14a and 14b are exposed to, e.g., are in fluid communication with, outside air. A material and a position of each layer is substantially the same as those in the first and second cells 10, 10a, 10b, 10c, 10d, 20, 20a, 20b, 20c, and 20d, and thus a repeated explanation thereof will not be given.

The fourth cell 40 is spaced apart from the first and second cells 10 and 20, and contacts the third cell 30.

A direction in which the fourth open surface 401 of the fourth cell 40 is disposed (hereinafter, referred to as the direction of the fourth open surface 401 of the fourth cell 40) may be different from a direction in which the third open surface 301 of the third cell 30 is disposed (hereinafter, referred to as the direction of the third open surface 301 of the third cell 30). For example, the direction of the fourth open surface 401 of the fourth cell 40 may be opposite to the direction of the third open surface 301 of the third cell 30.

The number of the first through fourth cells 10, 20, 30, and 40 is a singular number in the above embodiments. However, any suitable number of cells may be used, and the number of the first through fourth cells 10, 20, 30, and 40 may be a plural number.

Figure 6A:
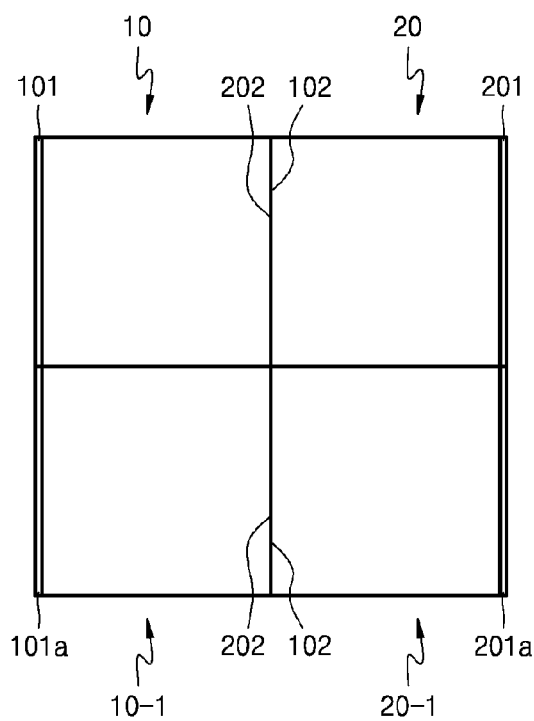
FIG. 6A is a plan view illustrating an embodiment in which the metal-air battery of FIG. 1B includes two first and second cells.
Figure 6B:
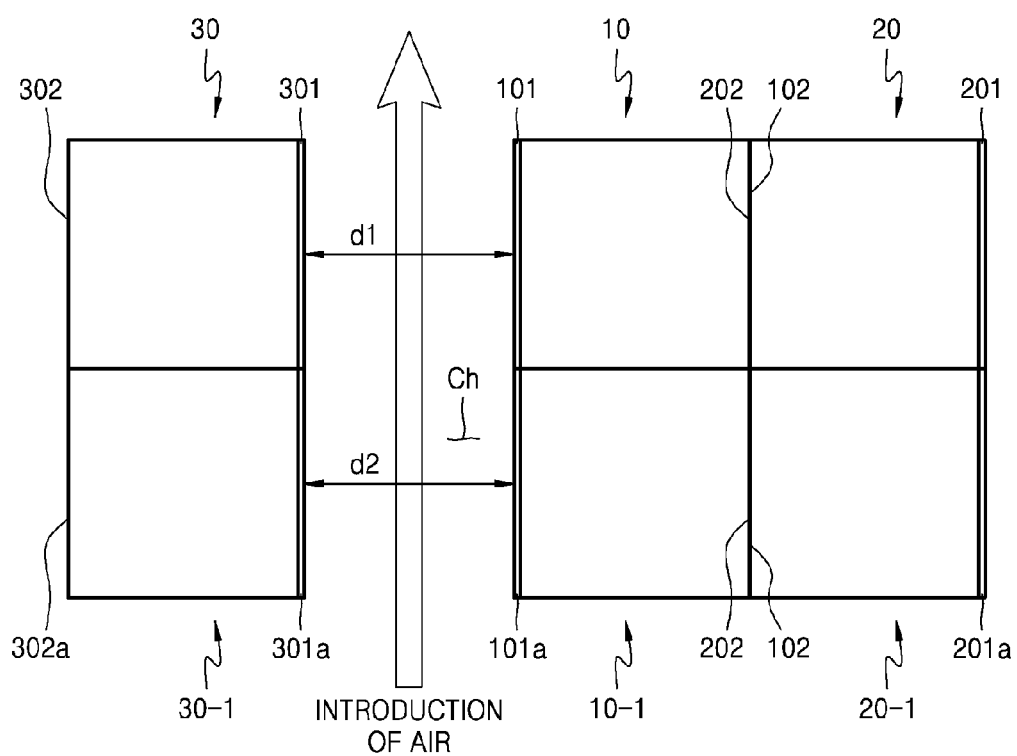
FIG. 6B is a plan view illustrating an embodiment in which the metal-air battery of FIG. 4 includes two first through third cells.
Figure 7:
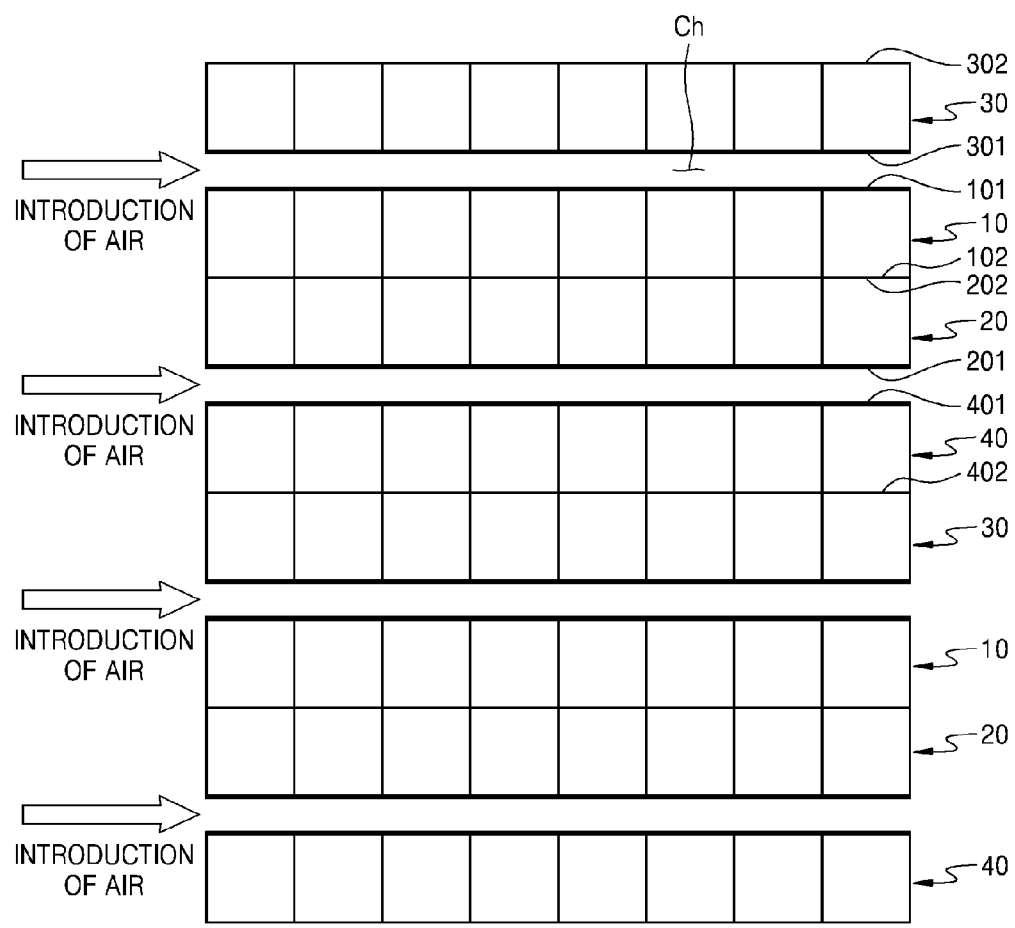
FIG. 7 is a plan view illustrating an embodiment in which the metal-air battery of any of FIGS. 6A through 6C includes three or more first through fourth cells.

FIG. 6A is a plan view illustrating another embodiment wherein the metal-air battery of FIG. 1B includes two first and second cells 10 and 20, according to an embodiment. FIG. 6B is a plan view illustrating another embodiment wherein the metal-air battery of FIG. 4 includes two first through third cells 10, 20, and 30, according to an embodiment. FIG. 6C is a plan view illustrating another embodiment wherein the metal-air battery of FIG. 5 includes two first through fourth cells 10, 20, 30, and 40, according to an embodiment. FIG. 7 is a plan view illustrating another embodiment wherein the metal-air battery of any of FIGS. 6A through 6C includes three or more first through fourth cells 10, 20, 30, and 40, according to an embodiment.

Referring to FIG. 6A, a plurality of the first and second cells 10 and 20 may be provided.

The plurality of first cells 10 and 10-1 may be arranged in a first direction. The first cell 10 may contact the first cell 10-1 that is adjacent to the first cell 10, and the direction of the first open surface 101 of the first cell 10 may be the same as a direction in which the first open surface 101a of the first cell 10-1 is disposed (hereinafter, referred to as the direction of the first open surface 101a of the first cell 10-1). For example, the first open surface 101 of the first cell 10 is formed in a left-hand direction and the first open surface 101a of the first cell 10-1 is also formed in the left-hand direction.

The plurality of second cells 20 and 20-1 may be arranged in a direction that is parallel to the first direction. The second cell 20 contacts the first inner surface 102 of the first cell 10 and contacts the second cell 20-1 that is adjacent to the second cell 20. The direction of the second open surface 201 of the second cell 20 may be the same as a direction in which the second open surface 201a of the second cell 20-1 is disposed (hereinafter, referred to as the direction of the second open surface 201a of the second cell 20-1). For example, the second open surface 201 of the second cell 20 is formed in a right-hand direction and the second open surface 201a of the second cell 20-1 is formed in the right-hand direction.

Referring to FIGS. 6B and 6C, a plurality of the first through fourth cells 10, 10-1, 20, 20-1, 30, 30-1, 40 and 40-1 may be provided. The plurality of first and second cells 10, 10-1, 20 and 20-1 may be arranged in the same manner as that of FIG. 6A, and thus a repeated explanation thereof will not be given.

Each of the plurality of third cells 30 and 30-1 is spaced apart from the first and second cells 10, 10-1, 20 and 20-1. The third cell 30 may contact a third cell 30-1 that is adjacent to the third cell 30 and the direction of the third open surface 301 of the third cell 30 may be the same as a direction in which the third open surface 301a of the third cell 30-1 is disposed (hereinafter, referred to as the direction of the third open surface 301a of the third cell 30-1). For example, the third open surface 301 of the third cell 30 is formed in a right-hand direction and the third open surface 301a of the third cell 30-1 is formed in the right-hand direction.

The direction of the third open surface 301 of the third cell 30 may be opposite to the direction of the first open surface 101 of the first cell 10. For example, the third open surface 301 of the third cell 30 is formed in a right-hand direction and the open surface 101 of the first cell 10 that faces the third cell 30 is formed in a left-hand direction.

Each of the plurality of fourth cells 40 and 40-1 is spaced apart from the first and second cells 10, 10-1, 20 and 20-1 and contacts the third cell 30 or 30-1. The fourth cell 40 may contact a fourth cell 40-1 that is adjacent to the fourth cell 40, and the direction of the fourth open surface 401 of the fourth cell 40 may be the same as a direction in which the fourth open surface 401a of the fourth cell 40-1 is disposed (hereinafter, referred to as the direction of the open surface 401 of the fourth cell 40-1). For example, the fourth open surface 401 of the fourth cell 40 is disposed in a left-hand direction and the direction of the fourth open surface 401 of the fourth cell 40-1 is disposed in the left-hand direction.

The plurality of third cells 30 and 30-1 may be arranged in the direction that is parallel to the first direction. Accordingly, a size, for example, a width, of the channel Ch that is defined by the third open surface 301 of the third cells 30 and the third open surface 301a of the third cell 30-1 and the first open surface 101 of the first cells 10 and the first open surface 101a of the first cell 10-1 may be maintained constant to a direction in which air is introduced. For example, a size d1 of the channel Ch that is defined by the first and third open surfaces 101 and 301 of the first and third cells 10 and 30 may be the same as a size d2 of the channel Ch that is defined by the first and third open surfaces 101a and 301a of the first and third cells 10-1 and 30-1 that are adjacent to the first and third cells 10 and 30.

Referring to FIG. 7, a plurality of the first through fourth cells 10, 20, 30, and 40 may be provided. A plurality of the channels Ch may be provided. Each channel Ch may be defined by the first open surface 101 of the first cell 10 and the third open surface 301 of the third cell 30, or may be defined by the second open surface 201 of the second cell 20 and the fourth open surface 401 of the fourth cell 40.

Figure 8A:
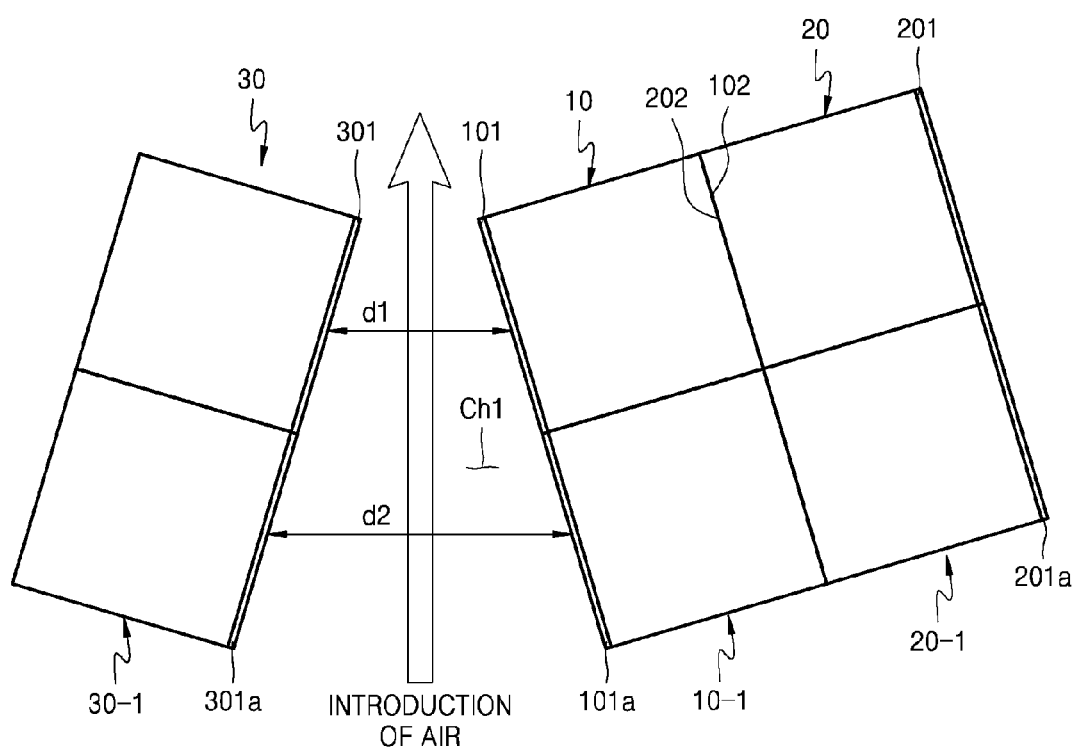
FIG. 8A is a plan view illustrating an embodiment in which a direction in which the third cell of FIG. 6B is arranged is changed.
Figure 8B:
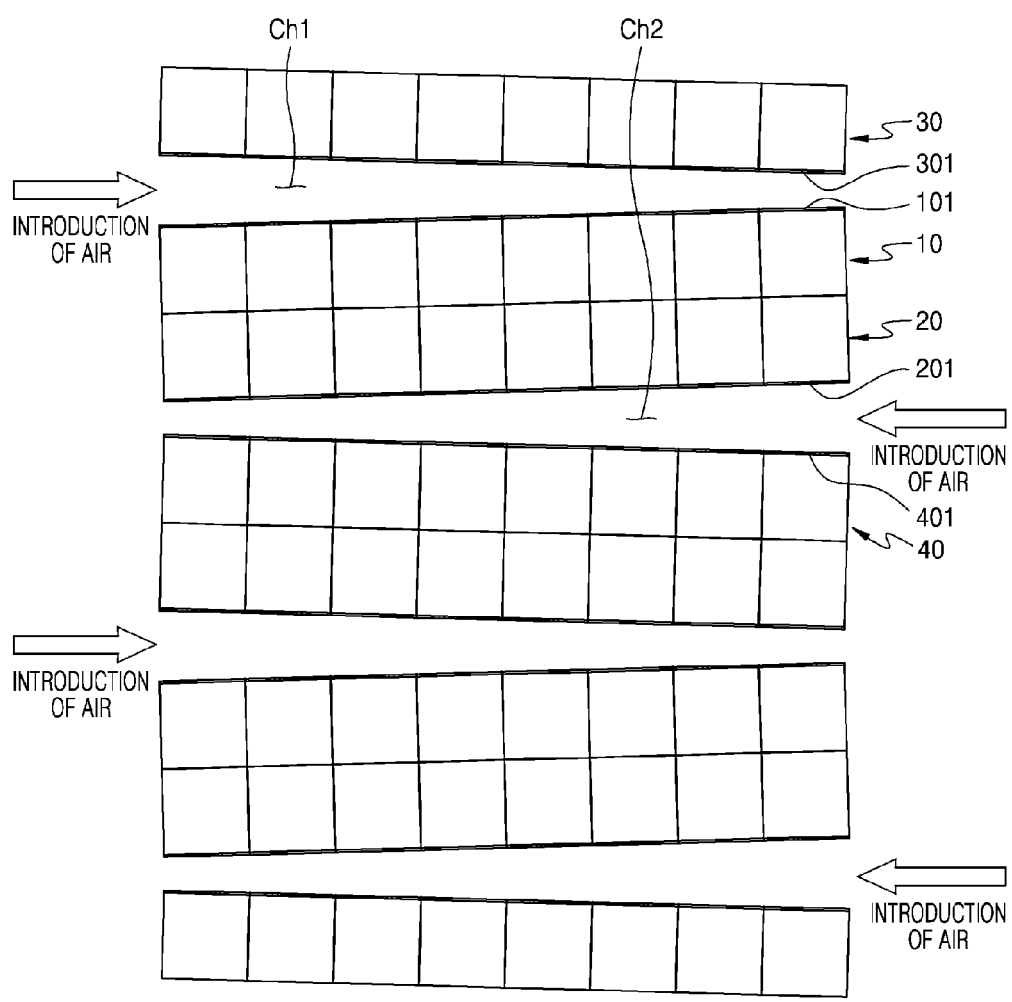
FIG. 8B is a plan view illustrating an embodiment in which the metal-air battery of FIG. 8A includes three or more first through third cells.

FIG. 8A is a plan view illustrating another embodiment wherein the array direction of the third cells 30 and 30-1 of FIG. 6B is changed, according to an embodiment. FIG. 8B is a plan view illustrating another embodiment wherein the metal-air battery of FIG. 8A includes three or more first through third cells 10, 20, and 30, according to an embodiment.

Referring to FIGS. 8A and 8B, a plurality of third cells 30 and 30-1 may be arranged in a direction that is inclined with respect to the first direction. Accordingly, a size of the channel Ch that is defined by the third open surfaces 301 and 301a of the third cells 30 and 30-1 and the open surface 101 of the first cells 10 and 10-1 may decrease in a direction in which air is introduced.

For example, the size d1 of the channel Ch that is defined by the first and third open surfaces 101 and 301 of the first and third cells 10 and 30 may be less than the size d2 of the channel Ch that is defined by the first and third open surfaces 101a and 301a of the first and third cells 10-1 and 30-1 that are adjacent to the first and third cells 10 and 30. As such, as the sizes d1 and d2 of the channel Ch decrease in the direction in which the air is introduced, a flow velocity of the air that passes through the channel Ch may increase.

Referring to FIG. 8B, directions in which air is introduced to a plurality of the channels Ch (hereinafter, referred to as the air introduction direction of each channel Ch) may be different from one another. For example, the air introduction direction of a first channel Ch1 may be a direction from the left to the right and the air introduction of a second channel Ch2 that is located under the first channel Ch1 may be a direction from the right to the left. Sizes of the first and second channels Ch1 and Ch2 may decrease in the air introduction directions. Accordingly, flow velocities of the air that passes through the first and second channels Ch1 and Ch2 may increase.

Figure 9:
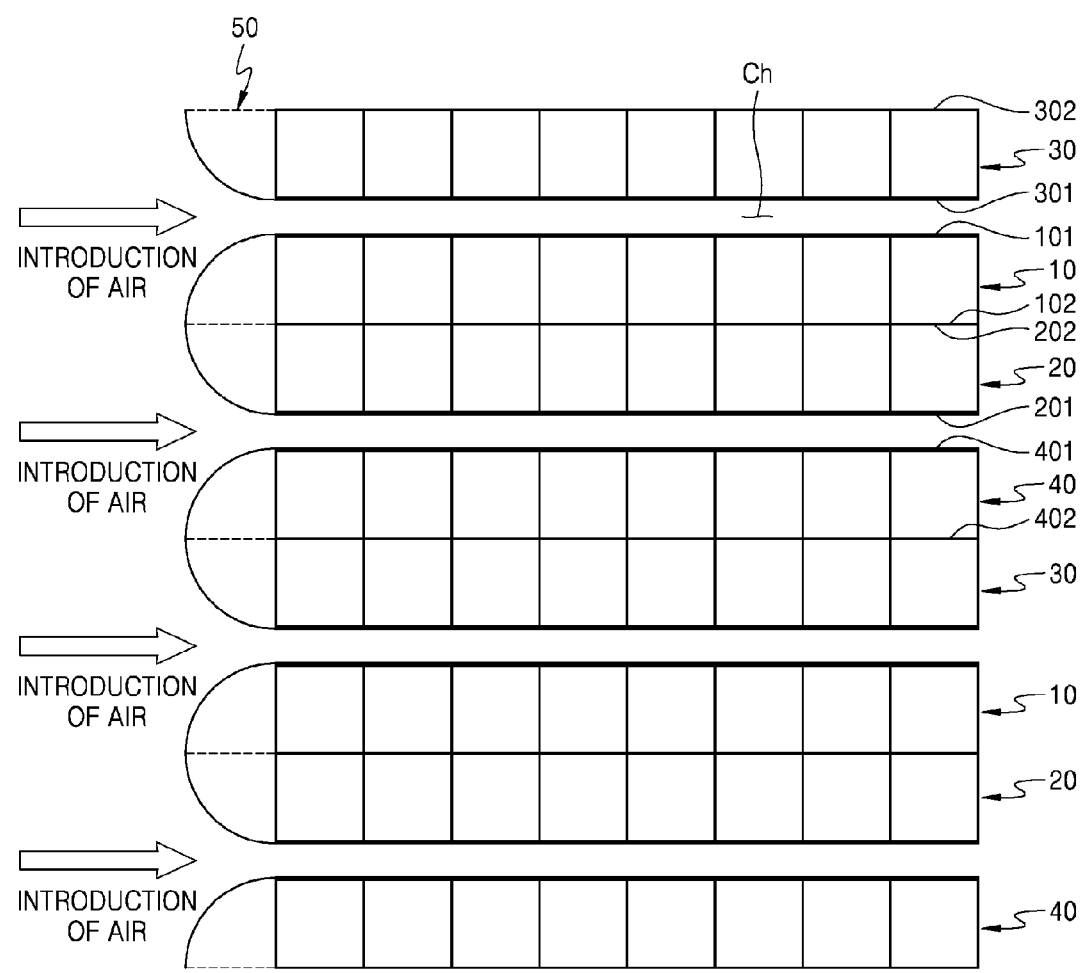
FIG. 9 is a plan view illustrating an embodiment in which the metal-air battery of FIG. 7 further includes a nozzle.

FIG. 9 is a plan view illustrating another embodiment wherein the metal-air battery of FIG. 7 further includes a nozzle 50, according to an embodiment. Referring to FIG. 9, in the metal-air battery, the nozzle 50 may be disposed around an inlet of each channel Ch. A cross-sectional area of the nozzle 50 may decrease in a direction in which air is introduced. The air may be smoothly supplied to the channel Ch through the nozzle 50 that is disposed around the inlet of the channel Ch.

Figure 10:
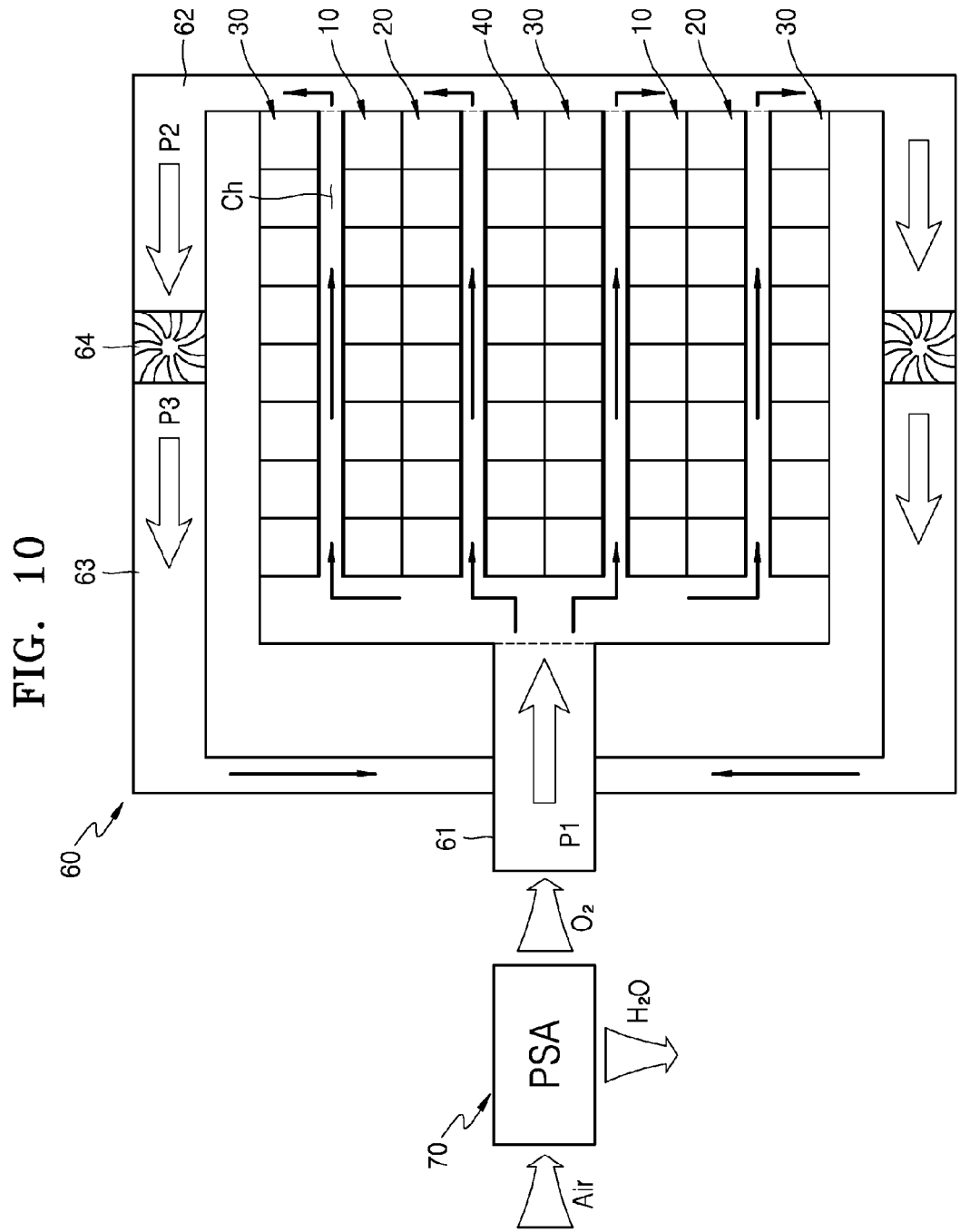
FIG. 10 is a conceptual view illustrating another embodiment of the metal-air battery.

FIG. 10 is a schematic diagram illustrating the metal-air battery according to another embodiment. Referring to FIG. 10, the metal-air battery may further include an air circulator 60. The air circulator 60 includes a first area 61 that is disposed around an inlet of each channel Ch, a second area 62 that is disposed around an outlet of the channel Ch, and a third area 63 that connects the first area 61 and the second area 62.

A first pressure P1 of the first area 61 is greater than a second pressure P2 of the second area 62. In other words, since the first pressure P1 is greater than the second pressure P2, introduced air flows from the first area 61 to the second area 62.

A third pressure P3 of the third area 63 is greater than the first pressure P1. To this end, a fan 64 for increasing a pressure may be disposed between the second area 62 and the third area 63. Since the third pressure P3 of the third area 63 is greater than the first pressure P1 of the first area 61, the air of the third area 63 may return to the first area 61.

That is, the air that exits the outlet of the channel Ch and may return to the inlet of the channel Ch due to the air circulator 60. Hence, oxygen remaining in the air that exits the outlet of the channel Ch may be re-used.

External air is provided through the first area 61. An oxygen generator 70 for extracting oxygen from air in the atmosphere may be disposed in the first area 61. The oxygen generator 70 may use pressure swing adsorption (PSA). Air having a high oxygen concentration may be supplied to the channel Ch due to the oxygen generator 70.

The directions of the first open surface 101 of the first cell 10 and the second open surface 201 of the second cell 20 are different from each other, in particular, opposite to each other, in the above embodiments. However, the directions of the first and second open surfaces 101 and 201 of the first and second cells 10 and 20 are not limited thereto and various modifications may be made.

Figure 11A:
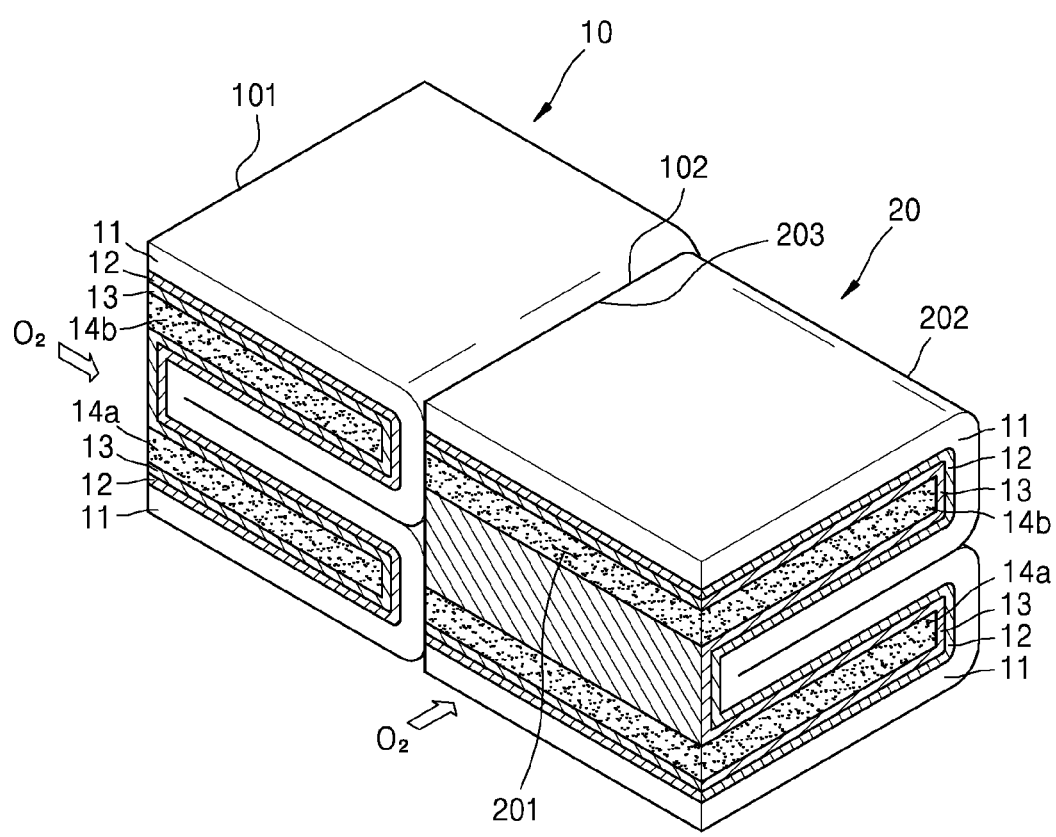
FIG. 11A is a perspective view illustrating another embodiment of the metal-air battery of FIG. 1A in which a direction of an open surface of the first cell and a direction of an open surface of the second cell are different than the embodiment of FIG. 1A.
Figure 11B:
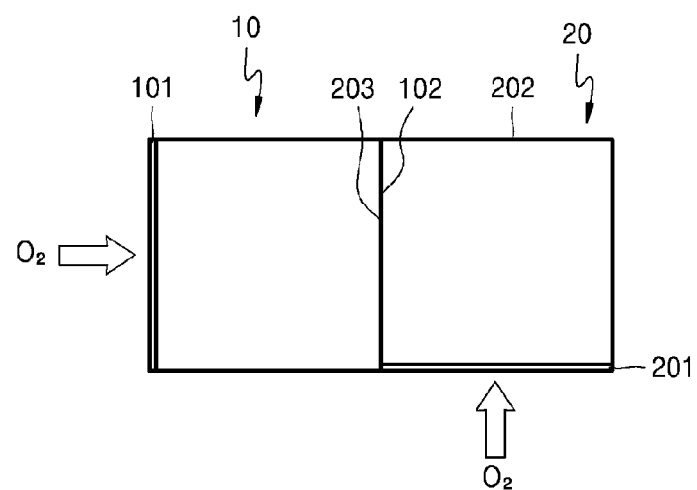
FIG. 11B is a plan view illustrating the metal-air battery of FIG. 11A.
Figure 12:
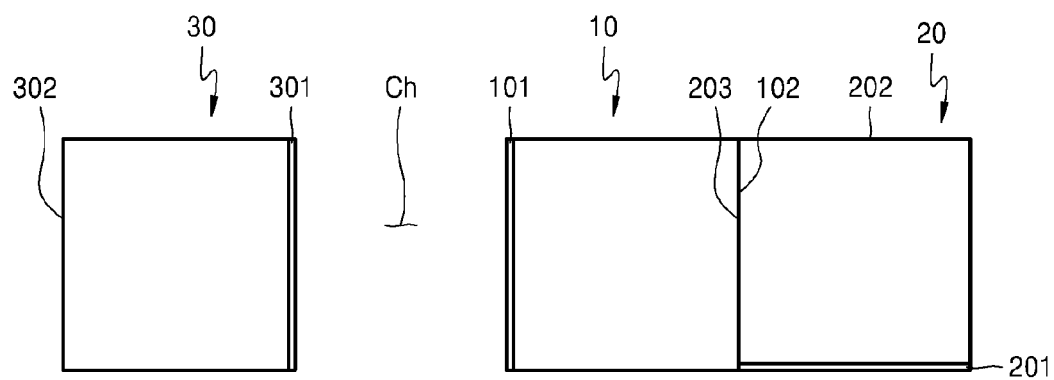
FIG. 12 is a plan view illustrating an embodiment in which the metal-air battery of FIG. 11B further includes the third cell.

FIG. 11A is a perspective view illustrating another embodiment of the metal-air battery of FIG. 1A in which the direction of the first open surface 101 of the first cell 10 and the direction of the second open surface 201 of the second cell 20 are changed, according to an embodiment. FIG. 11B is a plan view illustrating the metal-air battery of FIG. 11A, according to an embodiment. FIG. 12 is a plan view illustrating another embodiment wherein the metal-air battery of FIG. 11B further includes the third cell 30, according to an embodiment.

Referring to FIGS. 11A and 11B, the first open surface 101 of the first cell 10 may be disposed in a left-hand direction and the second open surface 201 of the second cell 20 may be disposed in a front direction. The second cell 20 may contact the first inner surface 102 of the first cell 10. The second cell 20 may contact the first inner surface 102 of the first cell 10 due to a side surface 203 that is disposed between the second open surface 201 and the second inner surface 202.

Referring to FIG. 12, the metal-air battery of the present embodiment may further include the third cell 30. The third cell 30 may be spaced apart from the first and second cells 10 and 20. The third cell 30 may be spaced apart by a predetermined interval from the first cell 10.

The third cell 30 may be spaced apart from the first cell 10 so that the third open surface 301 of the third cell 30 faces the first open surface 101 of the first cell 10.

The channel Ch to which air is introduced may be defined by the third open surface 301 of the third cell 30 and the first open surface 101 of the first cell 10. A size of the channel Ch may be determined by the predetermined interval between the third cell 30 and the first cell 10.

FIG. 13 is a perspective view illustrating another embodiment wherein the metal-air battery of FIG. 12 includes a plurality of the first through third cells 10, 20, and 30, according to an embodiment. Referring to FIG. 13, the first through third cells 10, 20, and 30 are arranged in a direction that is perpendicular to a direction in which air is introduced.

The first cell 10 and the second cell 20 contact each other. The directions of the first open surface 101 of the first cell 10 and the second open surface 201 of the second cell 20 are different from each other. For example, the direction of the first open surface 101 of the first cell 10 and the direction of the second open surface 201 of the second cell 20 may cross each other, and may be perpendicular.

The third cell 30 may be spaced apart from the first cell 10 so that the third open surface 301 of the third cell 30 and the first open surface 101 of the first cell 10 face each other. The channel Ch may be defined by the third open surface 301 of the third cell 30 and the open surface 101 of the first cell 10.

Air is introduced to the channel Ch in a predetermined direction. As the air is introduced to the channel Ch, the air is supplied to the first and third open surfaces 101 and 301 of the first and third cells 10 and 30.

A unit structure including the first through third cells 10, 20, and 30 may be repeatedly arranged in a direction that is perpendicular to the predetermined direction in which the air is introduced to the channel Ch. For example, the first through third cells 10, 20, and 30 may be vertically arranged and the first through third cells 10-1, 20-1, and 30-1 that are adjacent to the first through third cells 10, 20, and 30 may be horizontally arranged. A bottom surface of the channel Ch may be defined by the open surface 101 of the first cell 10, a top surface of the channel Ch may be defined by the third open surface 301 of the third cell 30, a right-hand surface of the channel Ch may be defined by the first open surface 101a of the first cell 10-1, and a left-hand surface of the channel Ch may be defined by the third open surface 301a of the third cell 30-1.

The first through third cells 10, 20, and 30 may have square cross-sectional shapes in the direction that is perpendicular to the predetermined direction in which the air is introduced. Hence, as shown in FIG. 13, the first through third cells 10, 20, and 30 may be repeatedly arranged in the direction that is perpendicular to the predetermined direction in which the air is introduced.

However, the first through third cells 10, 20, and 30 are not limited to the square cross-sectional shapes in the direction that is perpendicular to the predetermined direction in which the air is introduced and various modifications may be made. For example, the first through third cells 10, 20, and 30 may have a rectilinear, e.g., rectangular, cross-sectional shape in the direction that is perpendicular to the predetermined direction in which the air is introduced.

Figure 14A:
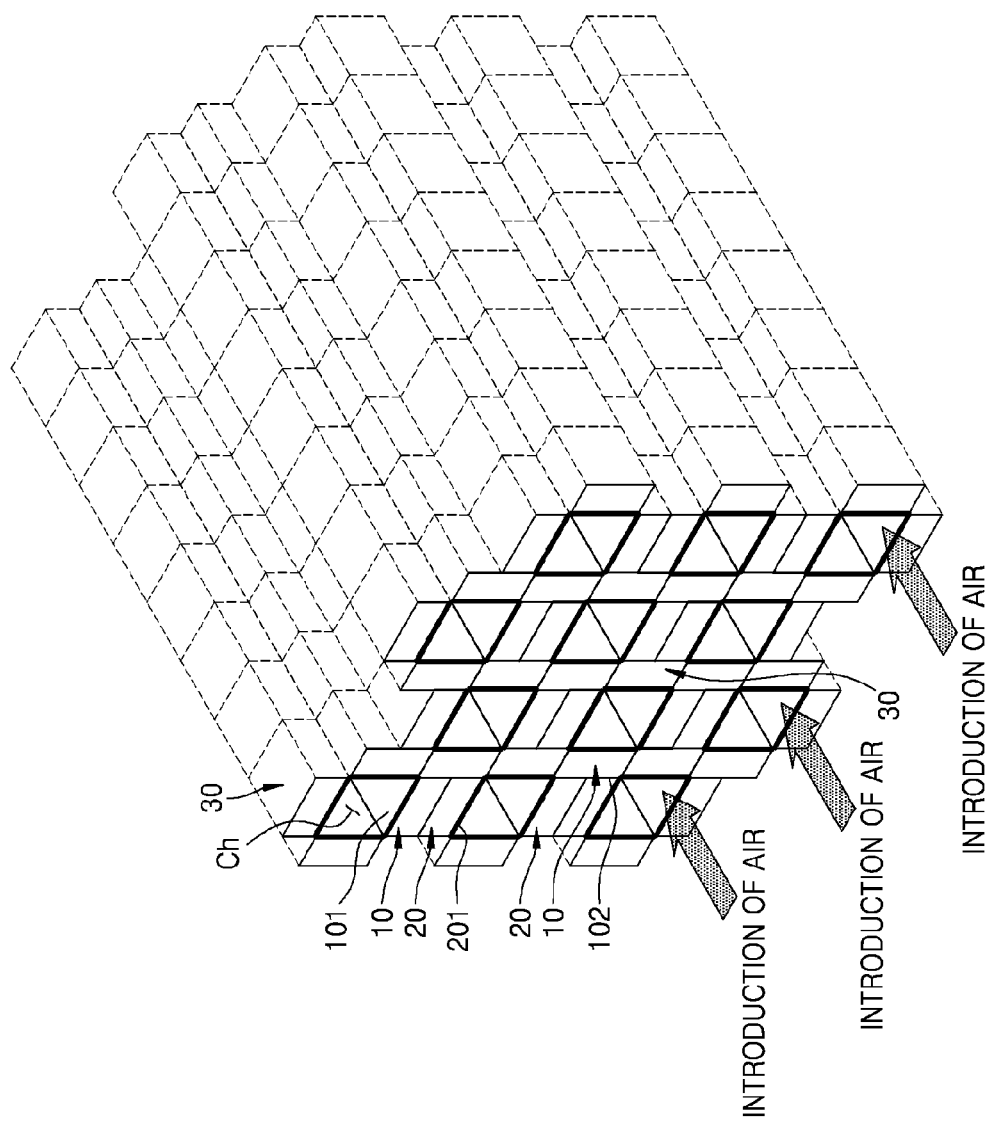
FIGS. 14A and 14B are perspective views illustrating an embodiment in which the metal-air battery including the first through third cells each have a rectilinear cross-sectional shape.
Figure 14B:
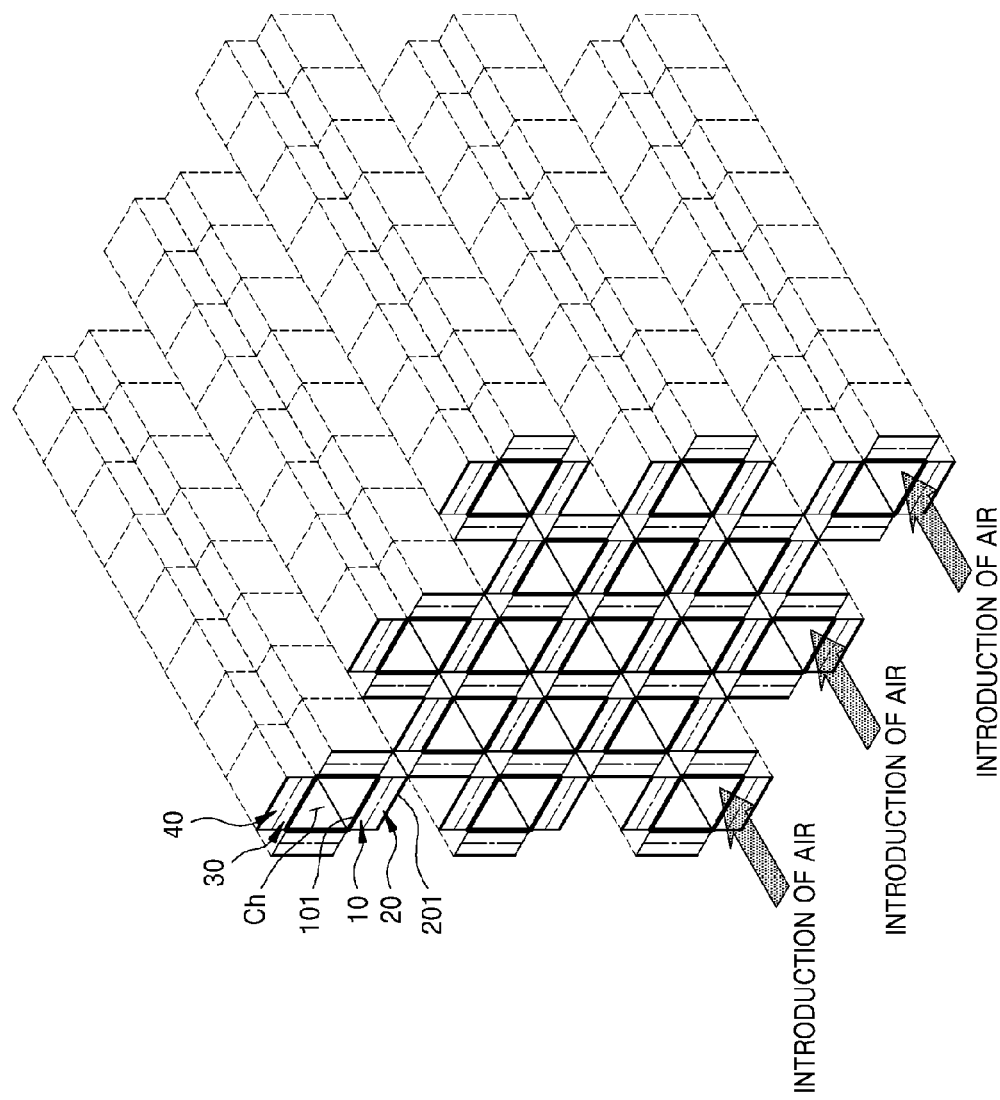

FIGS. 14A and 14B are perspective views illustrating the metal-air battery including the first through third cells 10, 20, and 30 having rectangular cross-sectional shapes, according to an embodiment. In FIGS. 14A and 14B, the first through third cells 10, 20, and 30 may have rectangular cross-sectional shapes. For example, an aspect ratio (or horizontal to vertical ratio) of cross-sectional shapes of the first through third cells 10, 20, and 30 may be 2:1. As such, as the cross-sectional shapes of the first through third cells 10, 20, and 30 change, a structure in which the first through third cells 10, 20, and 30 are repeatedly arranged may change. The second cell 20 may contact a part of the first inner surface 102 of the first cell 10.

Figure 15A:
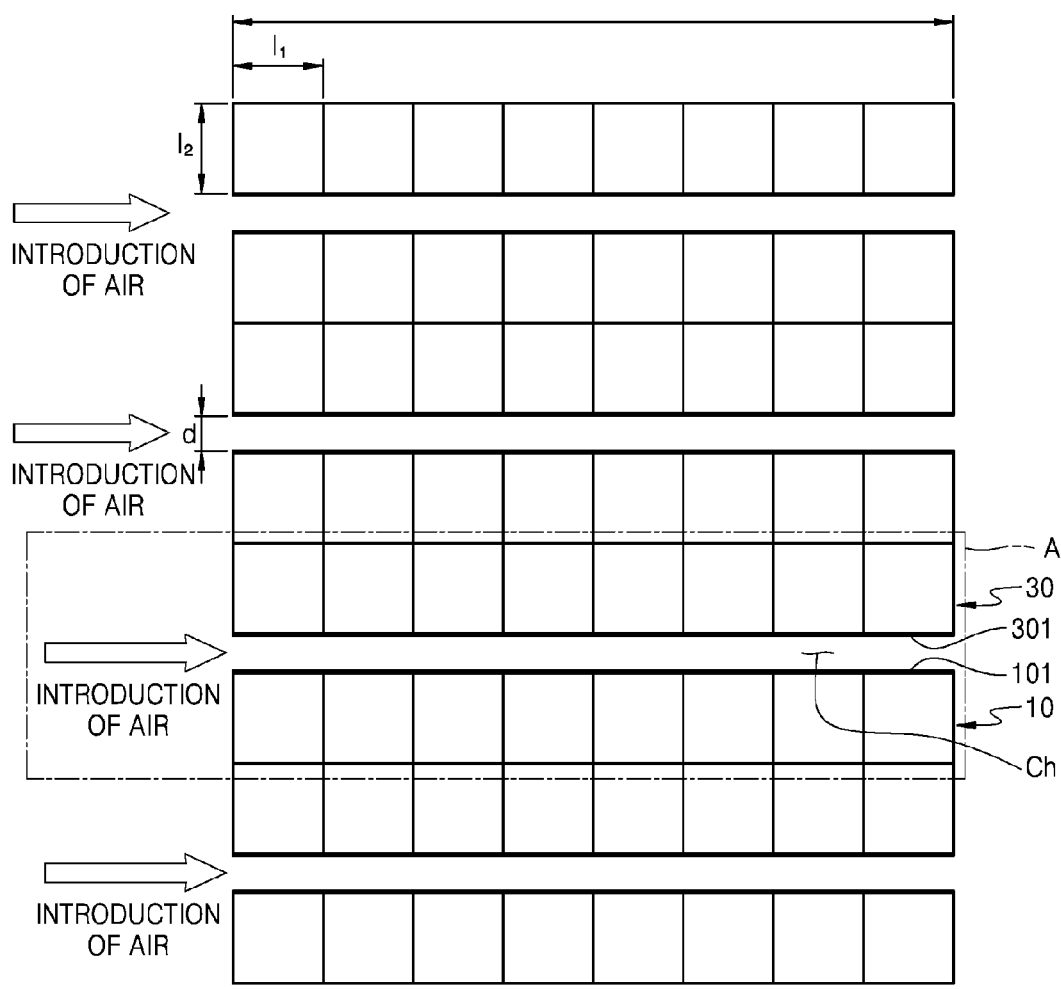
FIGS. 15A and 15B are plan views illustrating an embodiment of the metal-air battery.
Figure 15B:
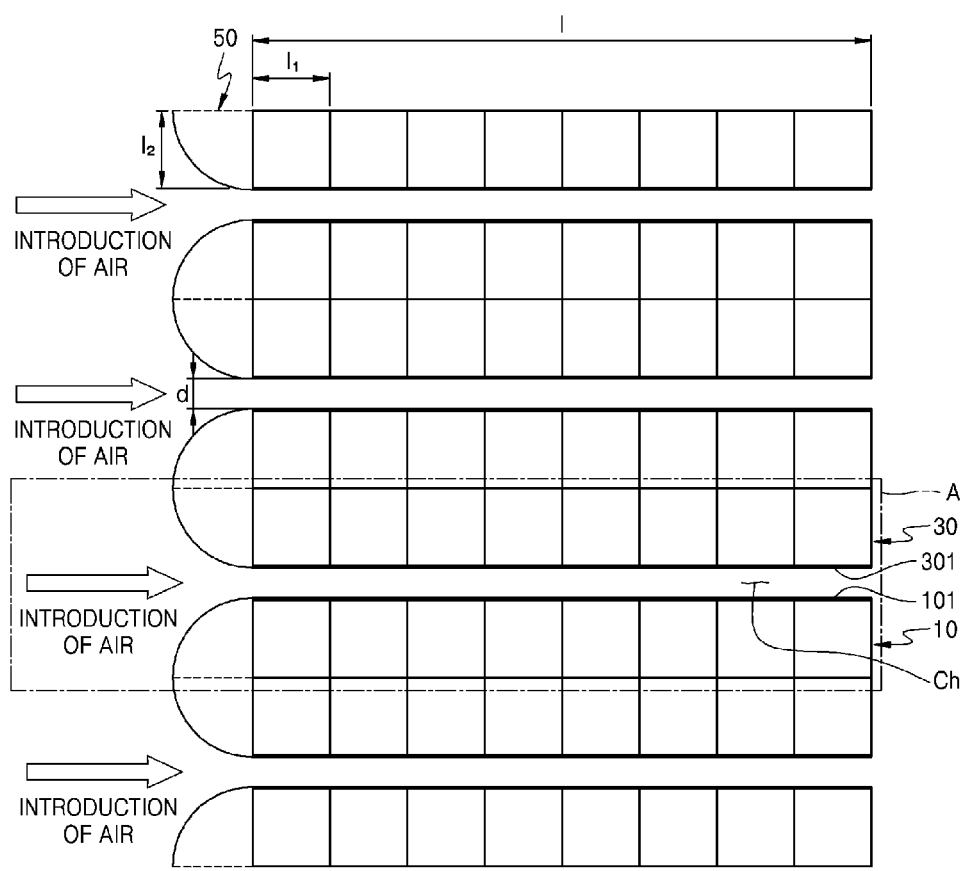

FIGS. 15A and 15B are plan views illustrating the metal-air battery according to an embodiment.

EXAMPLE

Figure 16A:
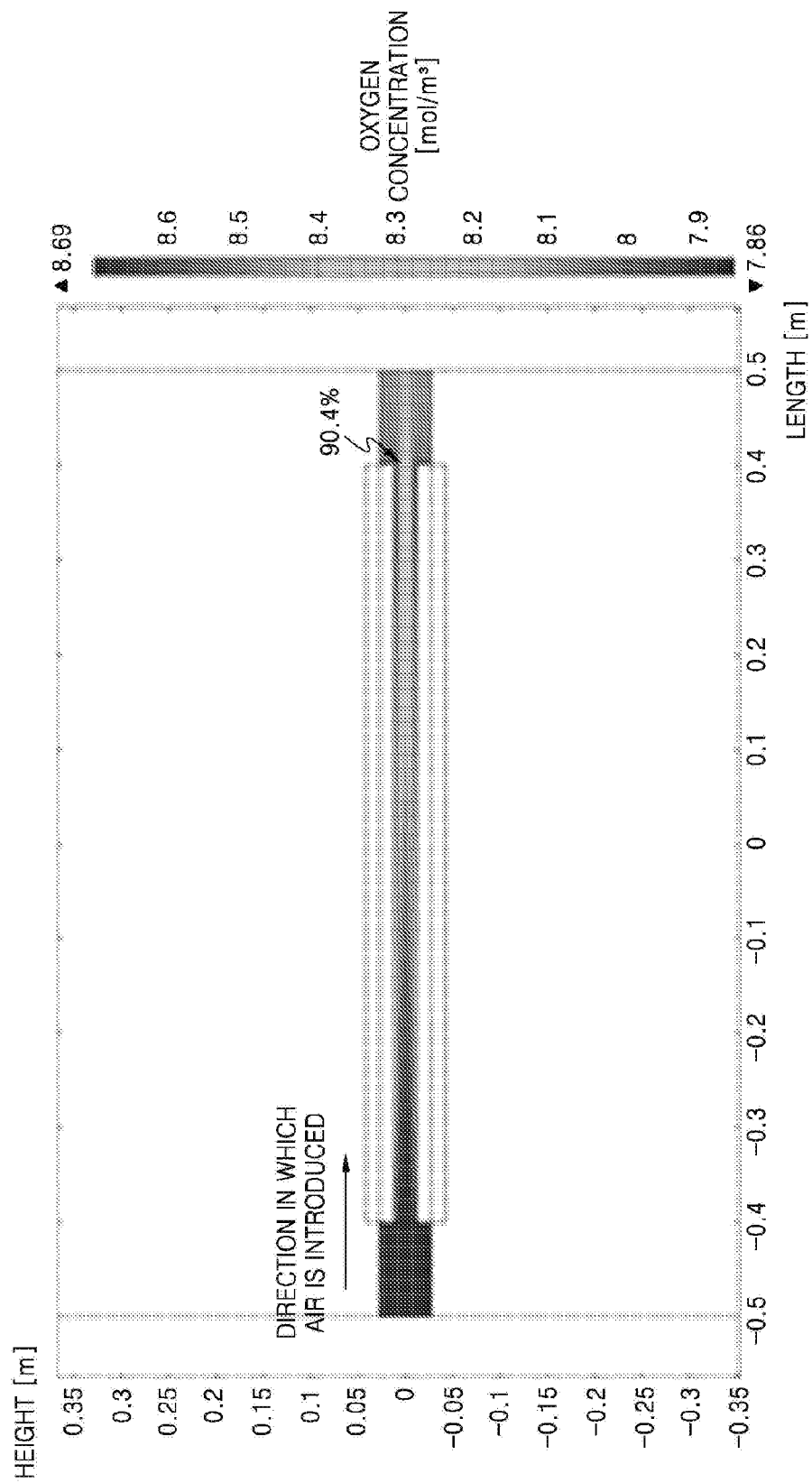
FIGS. 16A and 16B are each a graph of height (meters, m) versus length (meters, m) illustrating simulation results obtained after experimenting with air flowing in a channel that is disposed in an area A of the metal-air battery of FIGS. 15A and 15B.
Figure 16B:
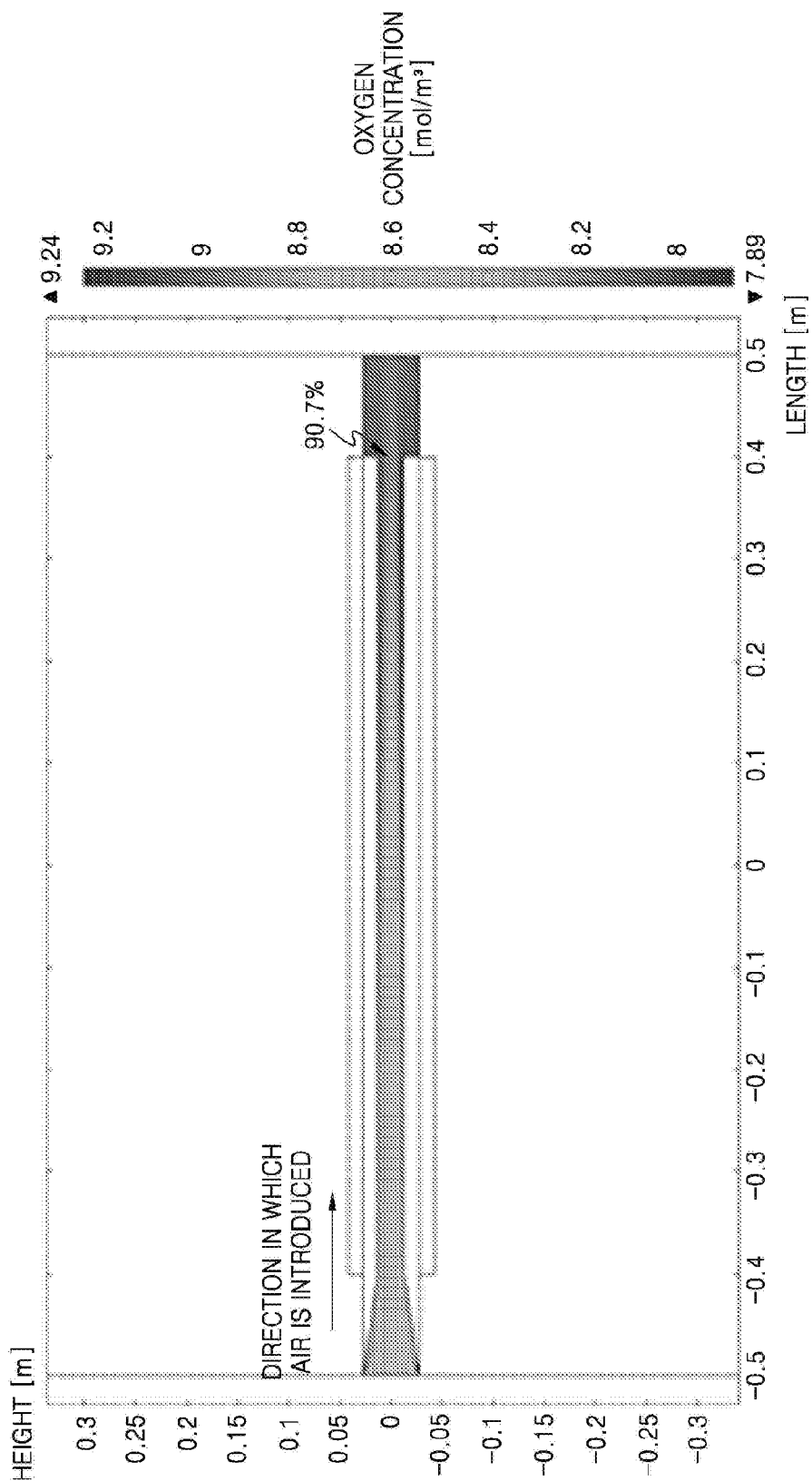

FIGS. 16A and 16B are graphs height (meters, m) and oxygen concentration (moles per cubic meter, mol/m$^3$) versus length (meters, m) illustrating simulation results obtained after making an experiment on air flowing in the channel Ch that is disposed in an area A of the metal-air battery of FIGS. 15A and 15B, according to an embodiment.

In FIGS. 15A and 15B, cells having such a folded structure as shown in FIG. 1A were used as the first and third cells 10 and 30 and a thickness of one sub-cell was set to 0.193 mm. A vertical size $I_2$ of the first and third cells 10 and 30 was set to 0.015 m, the size d of the channel Ch was set to 0.025 m, a length l of the channel Ch was set to 0.8 m, and a height h of the metal-air battery was set to 1 m. Also, an initial amount of oxygen in air supplied to the channel Ch was set to 8.69 moles per cubic meter (mol/m$^3$), an oxygen diffusion coefficient of each of the first and second GDLs 14a and 14b was 2.14×10$^{-5}$ square meters per second (m$^2$/sec), and a flow velocity v was set to 0.05 meters per second (m/sec). Unlike in FIG. 15A, in FIG. 15B, the nozzle 50 was disposed around an inlet of the channel Ch. In this state, an oxygen concentration of the air that passes through the channel Ch was measured.

Referring to FIG. 16A, an oxygen concentration of air that is detected around an outlet of the channel Ch to an oxygen concentration of air that is detected around the inlet of the channel Ch, that is, a residual oxygen concentration, was about 90.4%. That is, it is found that since the first and third open surfaces 101 and 301 of the first and third cells 10 and 30 face each other, air having a uniform oxygen concentration is supplied to the plurality of first open surfaces 101 that are formed in a longitudinal direction of the channel Ch.

Referring to FIG. 16B, a residual oxygen concentration that is an oxygen concentration of air that is detected around the outlet of the channel Ch to an oxygen concentration of air that is detected around the inlet of the channel Ch was about 90.7%. Since the nozzle 50 was disposed around the inlet of the channel Ch, the residual oxygen concentration increased by about 0.3%. Accordingly, it is found that since the nozzle 50 is disposed around the inlet of the channel Ch, an oxygen concentration of introduced air that passes through the channel Ch is maintained more constant.

Figure 17:
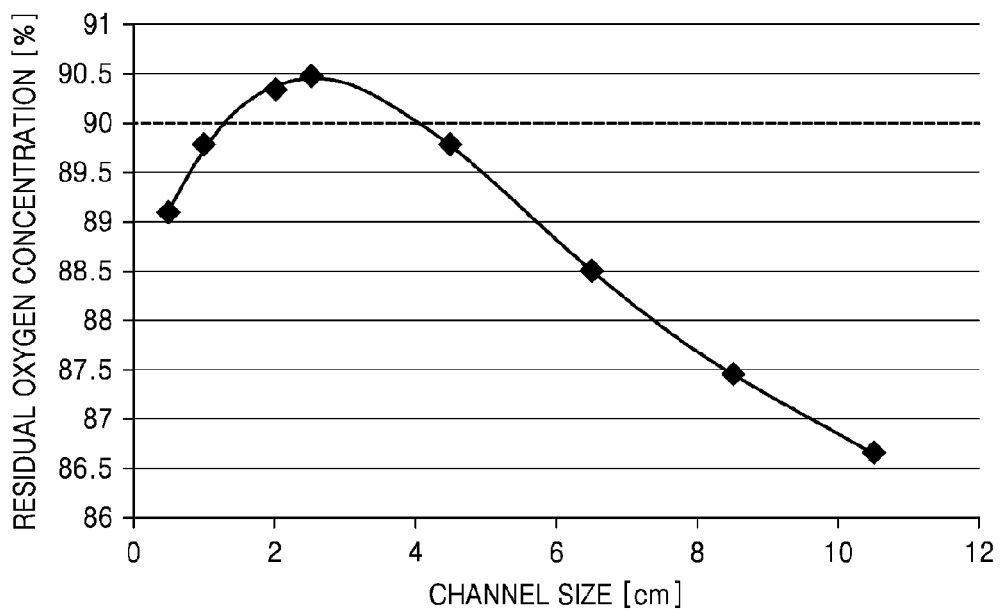
FIG. 17 is a graph of residual oxygen concentration (percent, %) versus channel size (centimeters, cm) illustrating a relationship between a size of the channel and a residual oxygen concentration of the metal-air battery of FIG. 15A.

FIG. 17 is a graph of residual oxygen concentration (percent) versus channel size (centimeters) illustrating a relationship between the size d of the channel Ch and a residual oxygen concentration of the metal-air battery of FIG. 15A, according to an embodiment. Referring to FIG. 17, as the size d of the channel Ch increases, the residual oxygen concentration decreases. In general, the size d of the channel Ch and the residual oxygen concentration are inversely proportional to each other. When the size d of the channel Ch is equal to or less than 4 cm, the residual oxygen concentration may be equal to or greater than about 90%. When the size d of the channel Ch is greater than 4 cm, the residual oxygen concentration may be less than about 90%.

However, when the size d of the channel Ch is less than a predetermined size, for example, about 2.5 cm, the residual oxygen concentration increases as the size d of the channel Ch increases. That may be because as the size d of the channel Ch itself increases, an amount of oxygen that may be introduced itself increases. When the size d of the channel Ch is equal to or greater than about 1.2 cm, the residual oxygen concentration may be equal to or greater than 90%, and when the size d of the channel Ch is less than about 1.2 cm, the residual oxygen concentration may be less than 90%. In an embodiment, d is about 0.1 to about 5 cm, or about 0.5 cm to about 3 cm.

Figure 18:
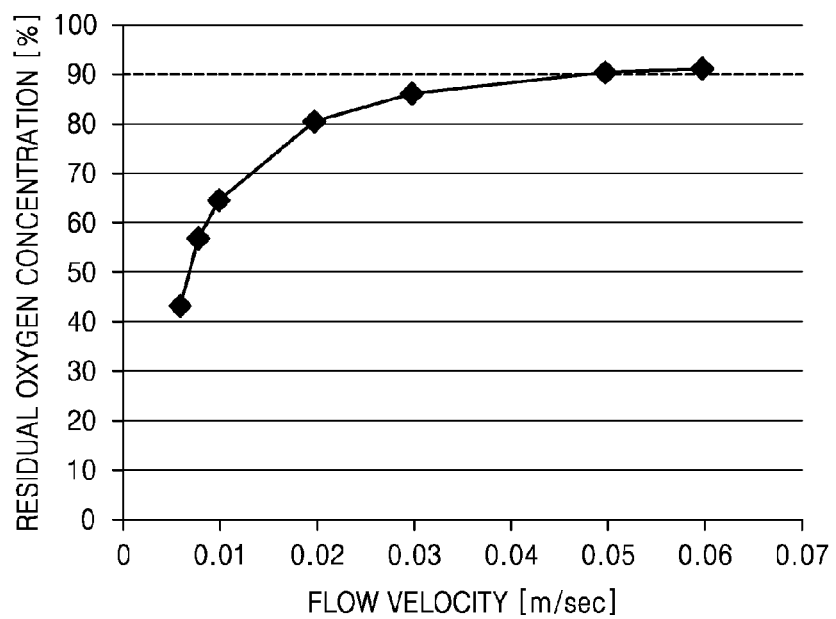
FIG. 18 is a graph of residual oxygen concentration (percent, %) versus flow velocity (meters per second, m/sec) illustrating a relationship between a flow velocity of air that is supplied to the channel and a residual oxygen concentration of the metal-air battery of FIG. 15A.

FIG. 18 is a graph of residual oxygen concentration (percent) versus flow velocity (meters per second, m/sec) illustrating a relationship between a flow velocity of air that is supplied to the channel Ch and a residual oxygen concentration of the metal-air battery of FIG. 15A, according to an embodiment. Referring to FIG. 18, when the flow velocity v of air that is supplied to the channel Ch increases, the residual oxygen concentration initially sharply increases and then smoothly increases. After the flow velocity v of the air that is supplied to the channel Ch exceeds about 0.05 m/sec, the residual oxygen concentration is almost constant even when the flow velocity v of the air increases. It is found that when other conditions are the same, there is a limitation in increasing the residual oxygen concentration by using the flow velocity v of the air. In an embodiment, use of a flow velocity of about 0.01 to about 0.07, or about 0.02 to about 0.06 is disclosed.

Figure 19:
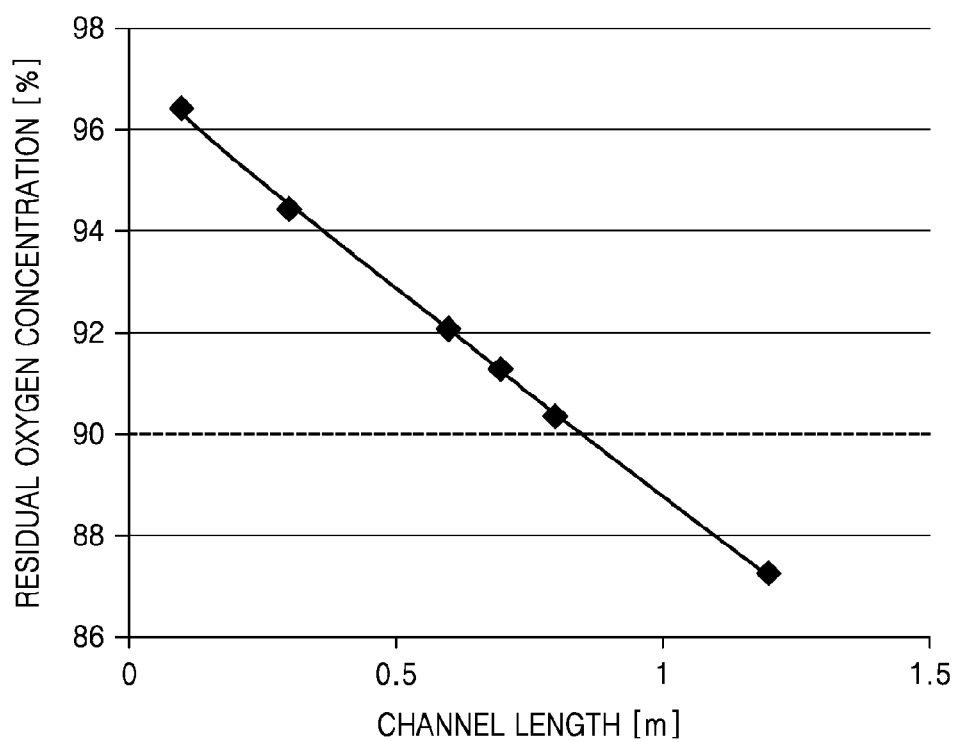
FIG. 19 is a graph of residual oxygen concentration (percent, %) versus channel length (meters, m) illustrating a relationship between a length of the channel and a residual oxygen concentration of the metal-air battery of FIG. 15A.

FIG. 19 is a graph of residual oxygen concentration (percent) versus channel length (meters, m) illustrating a relationship between the length l of the channel Ch and a residual oxygen concentration of the metal-air battery of FIG. 15A, according to an embodiment. Referring to FIG. 19, as the length l of the channel Ch increases, the residual oxygen concentration decreases. For example, when the length of the channel Ch is about 0.5 m, the residual oxygen concentration is about 93%. When the length l of the channel Ch increases to about 1 m, the residual oxygen concentration is about 89%.

The size d of the channel Ch may be determined so that the residual oxygen concentration is equal to or greater than a predetermined concentration by referring to FIGS. 17 through 19. The size d of the channel Ch may be determined by the length l of the channel Ch and the flow velocity v of the air that passes through the channel Ch. For example, in such conditions as shown in FIG. 15A, a maximum size $d_c$ of the channel Ch whose residual oxygen concentration may be equal to or greater than about 90% may be determined by using Equation 1:

$$d_c = 1.876 - 1.71 \times \frac{\exp(0.09 \times l)}{\tanh(87 \times v)}. \tag{1}$$

For example, when the length l of the channel Ch is about 0.8 m and the flow velocity v of the air that is supplied to the channel Ch is about 0.05 m/sec, the maximum size $d_c$ of the channel Ch whose residual oxygen concentration may be equal to or greater than about 90% is about 3.78 cm. However, values in Equation 1 are exemplary and thus modifications may be made as desired.

According to an embodiment, since a plurality of cells contact one another, and directions of open surfaces that are exposed to, e.g., are in fluid communication with, outside air are different from one another so that air is supplied to the plurality of cells, a metal-air battery may have an increased number of cells that are disposed in the same area and thus may provide increased energy density.

According to another embodiment, since in each of the plurality of cells, a negative electrode metal layer, a negative electrode electrolytic film, and a positive electrode layer are disposed in a bent state to surround GDLs and open surfaces of the GDLs that are exposed to, e.g., are in fluid communication with, outside air are spaced apart from each other to face each other, the metal-air battery may increase the number of cells that are disposed in the same area and thus may increase an energy density.

While the inventive concept has been particularly shown and described with reference to embodiments thereof by using specific terms, the embodiments and terms have merely been used to explain the inventive concept and should not be construed as limiting the scope of the inventive concept as defined by the claims. The embodiments should be considered in a descriptive sense only and not for purposes of limitation. Therefore, the scope of the inventive concept is defined not by the detailed description of the inventive concept but by the appended claims, and all differences within the scope will be construed as being included in the inventive concept.

What is claimed is:

1. A metal-air battery comprising:
a first cell comprising a first negative electrode metal layer, a first negative electrode electrolytic film, a first positive electrode layer configured to use oxygen as an active material, and a first gas diffusion layer,
wherein the first negative electrode electrolytic film is between the first negative electrode metal layer and the first positive electrode layer, and
the first positive electrode layer is between the first negative electrode electrolytic film and the first gas diffusion layer; and;
a third cell comprising
a third negative electrode metal layer,
a third negative electrode electrolytic film on the third negative electrode metal layer,
a third positive electrode layer configured to use oxygen as an active material and on the third negative electrode electrolytic film, and a third gas diffusion layer on the third positive electrode layer, wherein the third negative electrode electrolytic film is between the third negative electrode metal layer and the third positive electrode layer, and wherein the third positive electrode layer is between the third negative electrode electrolytic film and the third gas diffusion layer, wherein the first negative electrode metal layer, the first negative electrode electrolytic film, and the first positive electrode layer are in a bent state such that the first positive electrode layer contacts a first surface of the first gas diffusion layer and a second surface of the first gas diffusion layer that is disposed in a direction opposite to a direction in which the first surface of the first gas diffusion layer is disposed, and a side surface of the first gas diffusion layer between the first and second surfaces of the first gas diffusion layer are in fluid communication with outside air, wherein the third negative electrode metal layer, the third negative electrode electrolytic film, and third first positive electrode layer are in a bent state such that the third positive electrode layer contacts a first surface of the third gas diffusion layer and a second surface of the third gas diffusion layer that is disposed in a direction opposite to a direction in which the first surface of the third gas diffusion layer is disposed, and a side surface of the third gas diffusion layer between the first and second surfaces of the third gas diffusion layer are in fluid communication with outside air, wherein the first and third cells are spaced apart from each other and the open surface of the first cell and the open surface of the third cell face each other.

2. The metal-air battery of claim 1, wherein a channel to which air is introduced is defined by the open surface of the third cell and the open surface of the first cell.

3. The metal-air battery of claim 2, wherein a size of the channel is constant in a direction in which the air is introduced.

4. The metal-air battery of claim 2, wherein a size of the channel decreases in a direction in which the air is introduced.

5. The metal-air battery of claim 2, further comprising a nozzle that is disposed around an inlet of the channel and has a cross-sectional area that decreases in a direction in which the air is introduced.

6. The metal-air battery of claim 1, further comprising:

a second cell in which a second negative electrode metal layer, a second negative electrode electrolytic film, a second positive electrode layer that uses oxygen as an active material, and a second gas diffusion layer are sequentially disposed and have an open surface through which at least a portion of the second gas diffusion layer is in fluid communication with, outside air, and a fourth cell in which a fourth negative electrode metal layer, a fourth negative electrode electrolytic film, a fourth positive electrode layer that uses oxygen as an active material, and a fourth gas diffusion layer are sequentially disposed and have an open surface through which at least a portion of the fourth gas diffusion layer is in fluid communication with, outside air, wherein the second cell contacts the first cell and a direction extending perpendicular and away from the open surface of the second cell is different from a direction extending perpendicular and away from the open surface of the first cell, and wherein the fourth cell contacts the third cell and a direction extending perpendicular and away from the open surface of the fourth cell is different from a direction extending perpendicular and away from the open surface of the third cell.

7. The metal-air battery of claim 1, wherein a plurality of the first cells and a plurality of the third cells are provided, wherein the plurality of third cells is arranged in a direction that is parallel to the direction of the plurality of the first cells or is inclined with respect to the direction of the plurality of the first cells.

8. The metal-air battery of claim 1, wherein the first and third cells have a rectilinear cross-sectional shape.

9. The metal-air battery of claim 2, further comprising an air circulator that comprises a first area that is disposed around an inlet of the channel and is configured to provide a first pressure, a second area that is disposed around an outlet of the channel and is configured to provide a second pressure that is less than the first pressure, and a third area that connects the first area and the second area and is configured to provide a third pressure that is greater than the first pressure.

\* \* \* \* \*